United States Patent
Lee et al.

(10) Patent No.: US 9,690,133 B2
(45) Date of Patent: Jun. 27, 2017

(54) DISPLAY SUBSTRATE, DISPLAY PANEL AND DISPLAY APPARATUS HAVING THE DISPLAY SUBSTRATE

(71) Applicant: Samsung Display Co., Ltd., Yongin, Gyeonggi-Do (KR)

(72) Inventors: Kwang-Keun Lee, Osan-si (KR); Seon-Tae Yoon, Seoul (KR); Hyun-Min Cho, Hwaseong-si (KR); Jae-Byung Park, Seoul (KR); Hae-Il Park, Seoul (KR)

(73) Assignee: Samsung Display Co., Ltd. (KR)

( * ) Notice: Subject to any disclaimer, the term of this patent is extended or adjusted under 35 U.S.C. 154(b) by 157 days.

(21) Appl. No.: 14/248,134

(22) Filed: Apr. 8, 2014

(65) Prior Publication Data

US 2015/0131011 A1     May 14, 2015

(30) Foreign Application Priority Data

Nov. 8, 2013    (KR) .......................... 10-2013-0135891

(51) Int. Cl.
  *G02F 1/1335*    (2006.01)
  *G02B 27/26*    (2006.01)
  (Continued)

(52) U.S. Cl.
  CPC ....... *G02F 1/133514* (2013.01); *G02B 27/26* (2013.01); *G09G 3/003* (2013.01);
  (Continued)

(58) Field of Classification Search
  CPC ... G02F 1/133514; G02F 2001/133631; G02B 5/3083; G02B 27/26; H04N 13/0434; H04N 13/0422; G09G 3/003; G09G 2300/0452
  (Continued)

(56) References Cited

U.S. PATENT DOCUMENTS 7,170,482 B2    1/2007    Okita
7,388,630 B2    6/2008    Shin et al.
(Continued)

FOREIGN PATENT DOCUMENTS

JP    2001-091922 A    4/2001
JP    2002-372953 A    12/2002
(Continued)

*Primary Examiner* — Charles Chang
(74) *Attorney, Agent, or Firm* — Innovation Counsel LLP

(57) ABSTRACT

A display substrate includes a base substrate, a color filter layer and a retarder layer. The base substrate includes a first sub pixel area, a second sub pixel area and a third sub pixel area. The color filer layer is disposed on a front surface of the base substrate, and includes at least one of a magenta color filter, a cyan color filter and a yellow color filter in the first sub pixel area and the second sub pixel area and a white color filter in the third sub pixel area. The retarder layer is disposed on a rear surface of the base substrate opposite to the front surface of the base substrate. The retarder layer is configured to polarize light in the first sub pixel area and the second sub pixel area to form a first polarized light. The retarder layer is further configured to polarize the light in the third sub pixel area to form a second polarized light, the second polarized light being different from the first polarized light. Thus, a driving speed of a display apparatus may be decreased.

17 Claims, 47 Drawing Sheets

(51) Int. Cl.
- *H04N 13/04* (2006.01)
- *G09G 3/00* (2006.01)
- *G02B 5/30* (2006.01)
- *G02F 1/13363* (2006.01)

(52) U.S. Cl.
CPC ..... *H04N 13/0422* (2013.01); *H04N 13/0434* (2013.01); *G02B 5/3083* (2013.01); *G02F 2001/133631* (2013.01); *G09G 2300/0452* (2013.01)

(58) Field of Classification Search
USPC .......................................................... 349/106
See application file for complete search history.

(56) References Cited

U.S. PATENT DOCUMENTS

| | | | |
|---|---|---|---|
| 8,054,282 | B2 | 11/2011 | Park et al. |
| 2009/0051638 | A1* | 2/2009 | Horiuchi .............. G09G 3/2003 345/88 |
| 2012/0320173 | A1* | 12/2012 | Kim ..................... G02F 1/13363 348/60 |
| 2013/0027439 | A1 | 1/2013 | Kim et al. |
| 2013/0168680 | A1* | 7/2013 | Shin .................... H01L 33/0041 257/59 |
| 2013/0229326 | A1* | 9/2013 | Kamada ................ G09G 3/3648 345/32 |

FOREIGN PATENT DOCUMENTS

| | | |
|---|---|---|
| JP | 2007-155878 A | 6/2007 |
| JP | 2012-242547 A | 12/2012 |
| KR | 1020070002452 A | 1/2007 |
| KR | 1020070090427 A | 9/2007 |
| KR | 1020070119951 A | 12/2007 |
| KR | 1020120071735 A | 7/2012 |
| KR | 10-1192797 B1 | 10/2012 |
| KR | 1020120117317 A | 10/2012 |
| KR | 1020120118988 A | 10/2012 |
| KR | 1020130003966 A | 1/2013 |

* cited by examiner

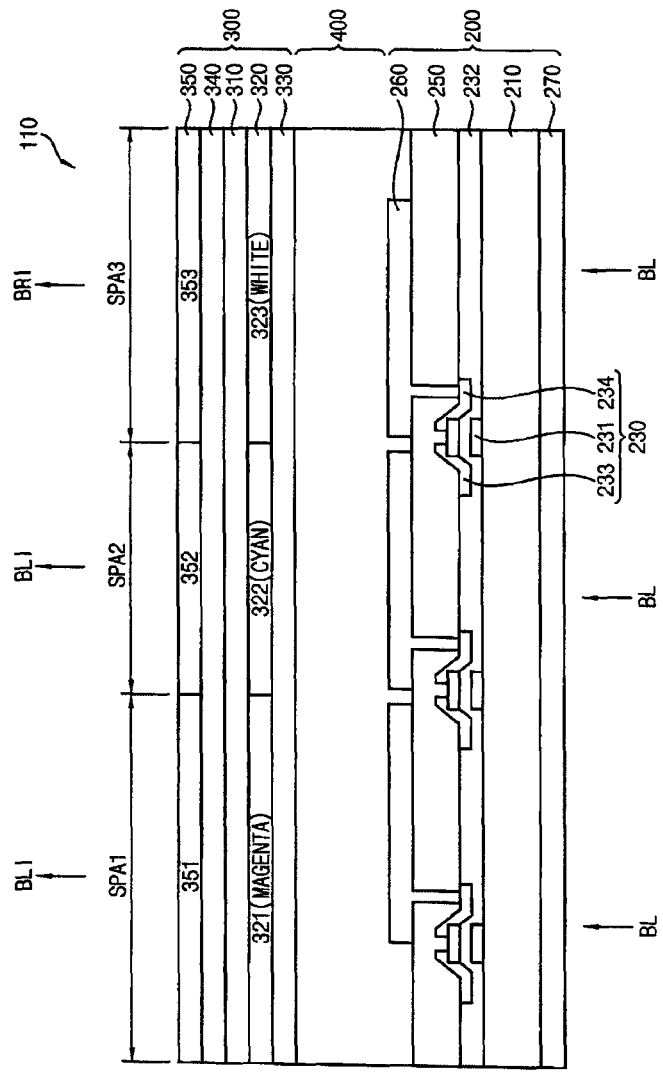

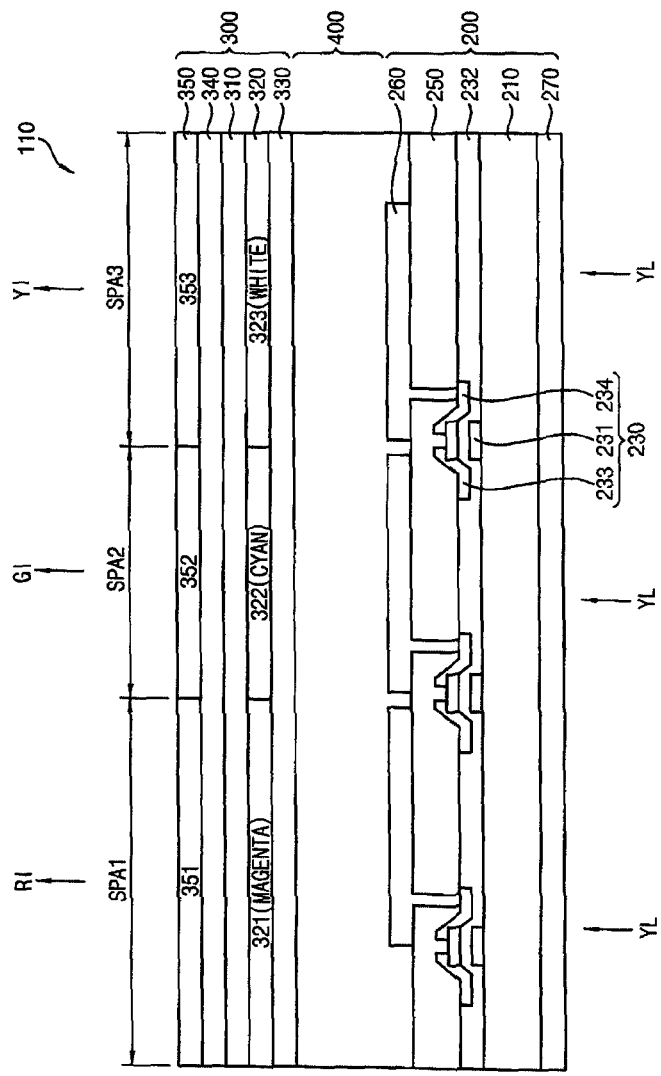

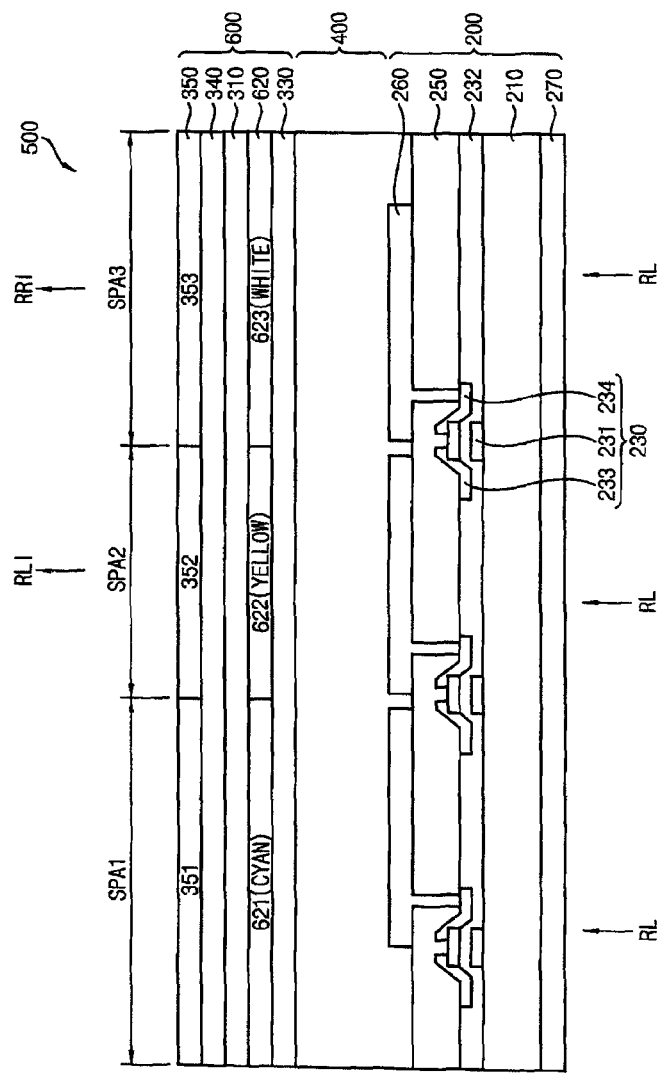

FIG. 6B

| SPA1 | SPA2 | SPA3 |
|---|---|---|
|  | ↘ | ↙ |
|  | RL1 | RR1 |

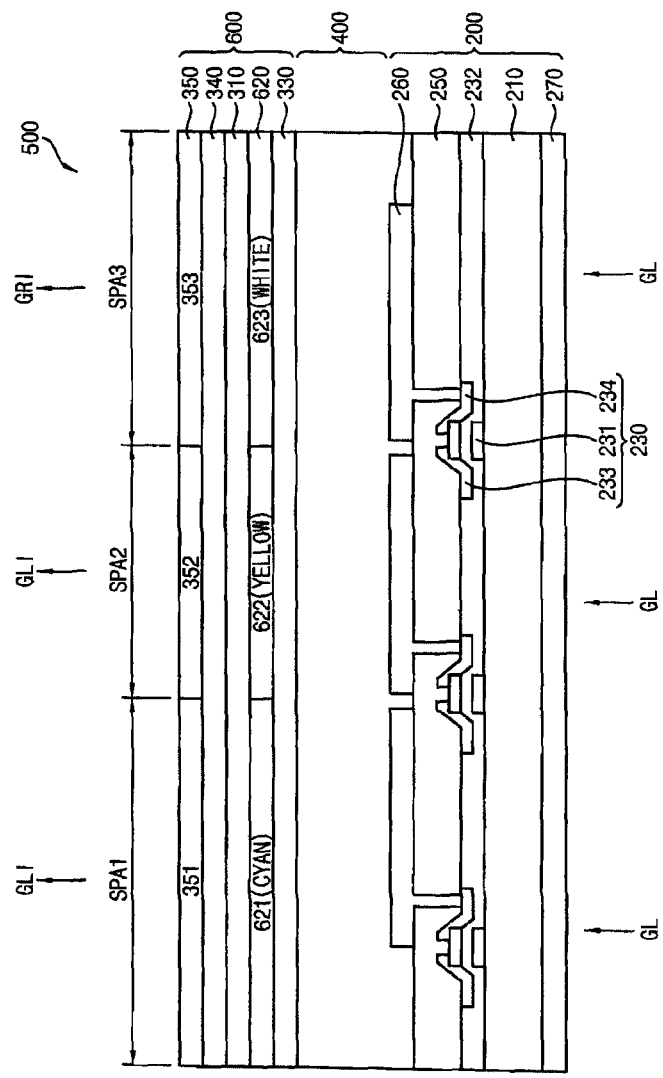

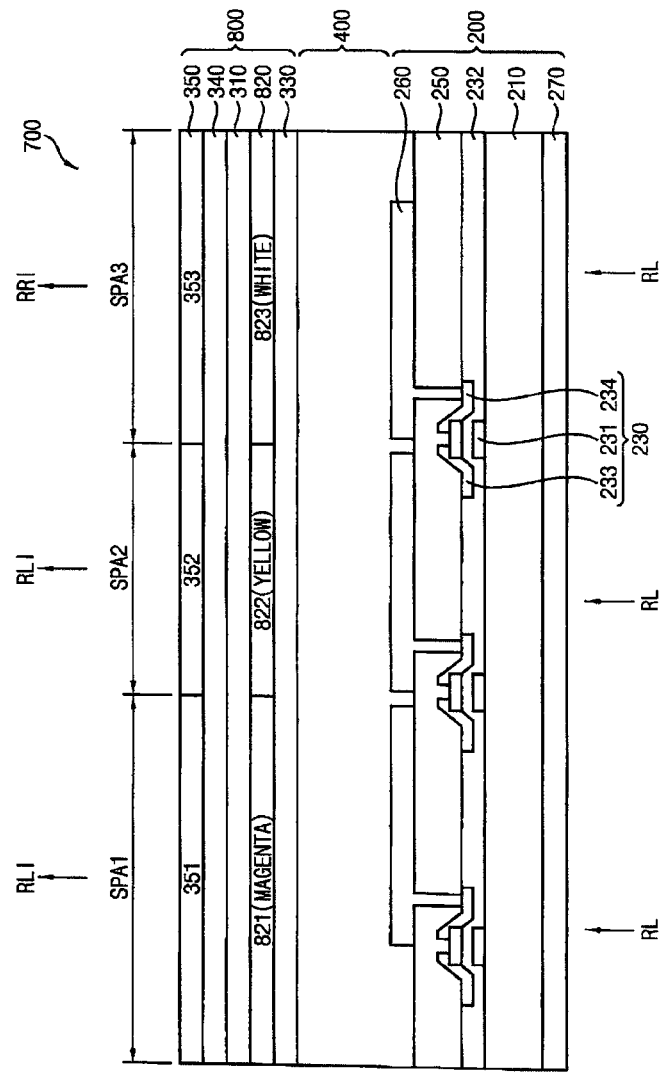

FIG. 8B

| SPA1 | SPA2 | SPA3 |
|------|------|------|
| ↘ | ↘ | ↗ |
| RLI | RLI | RRI |

FIG. 8D

| SPA1 | SPA2 | SPA3 |
|------|------|------|
|      | ＼    | ／    |
|      | GLl  | GRl  |

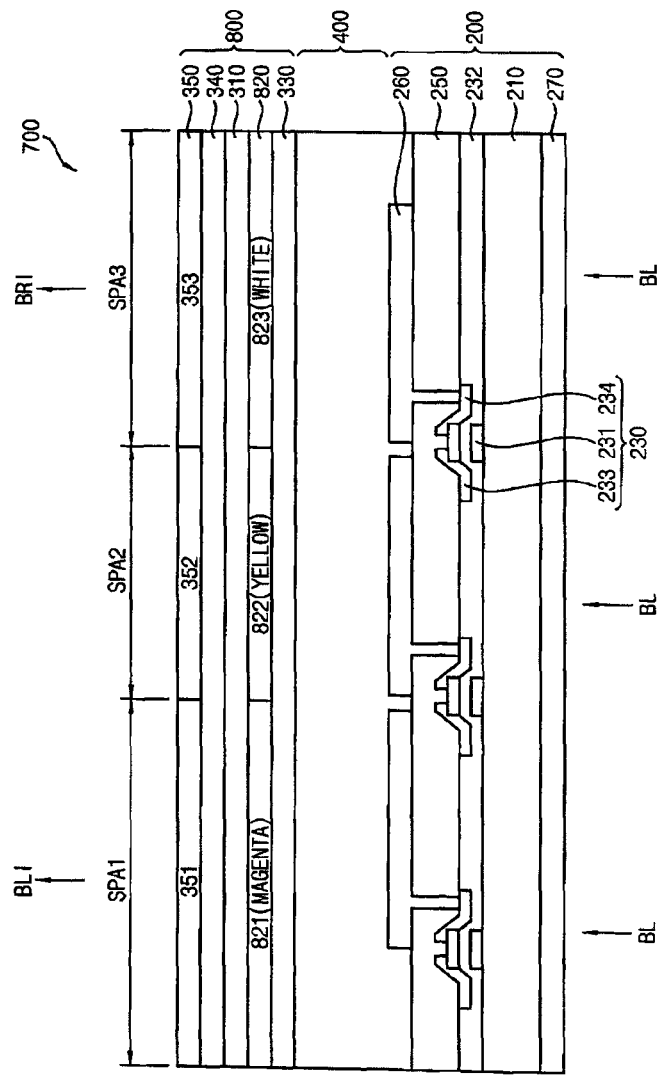

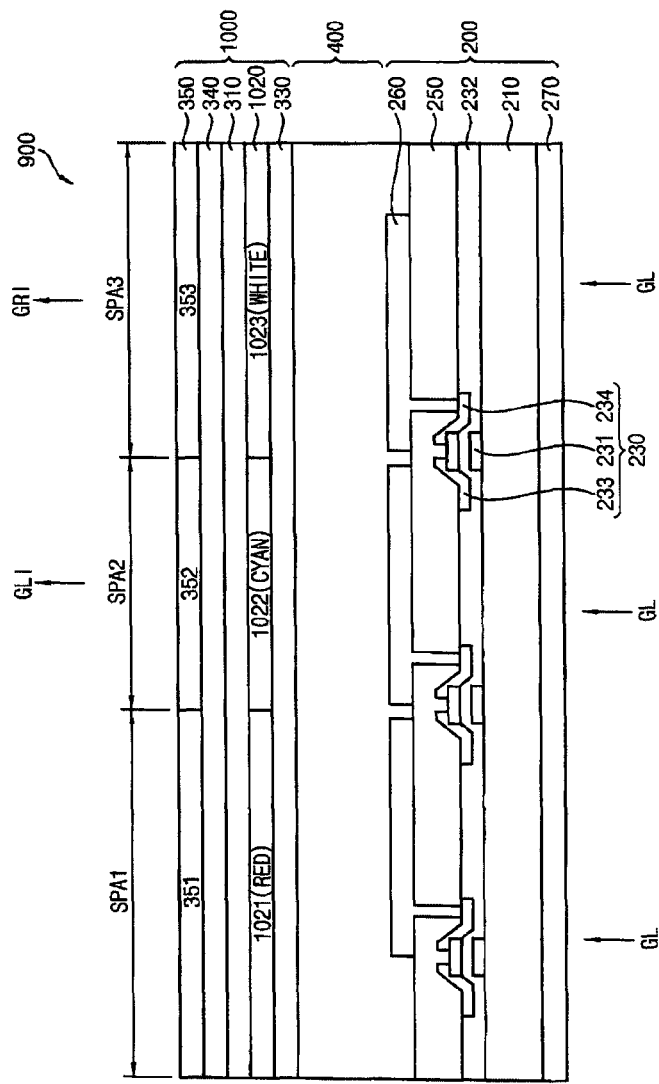

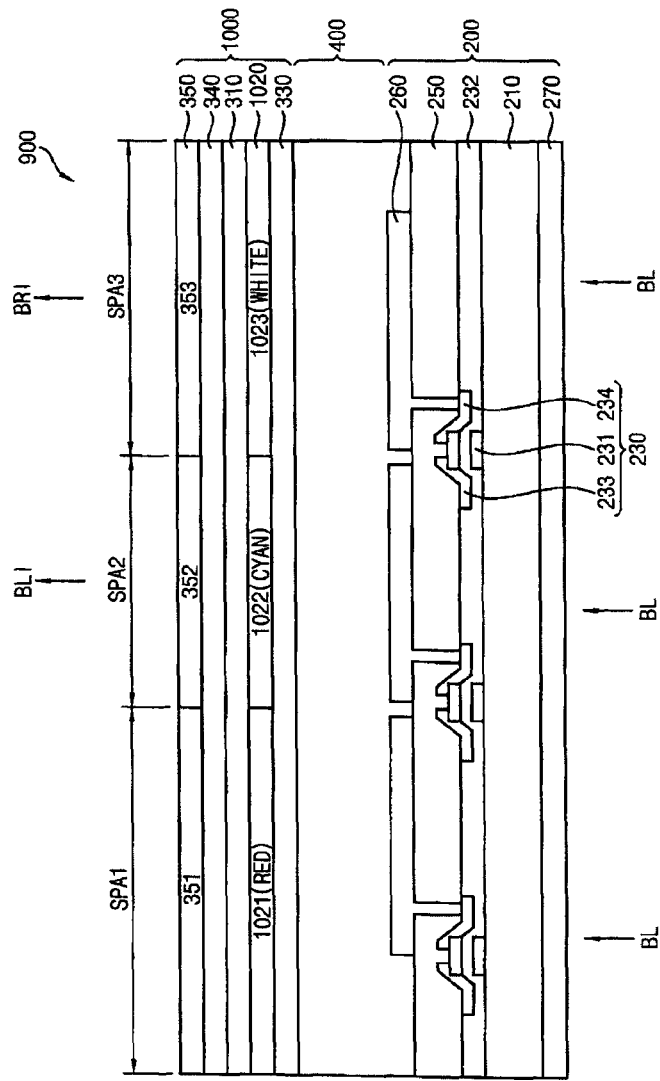

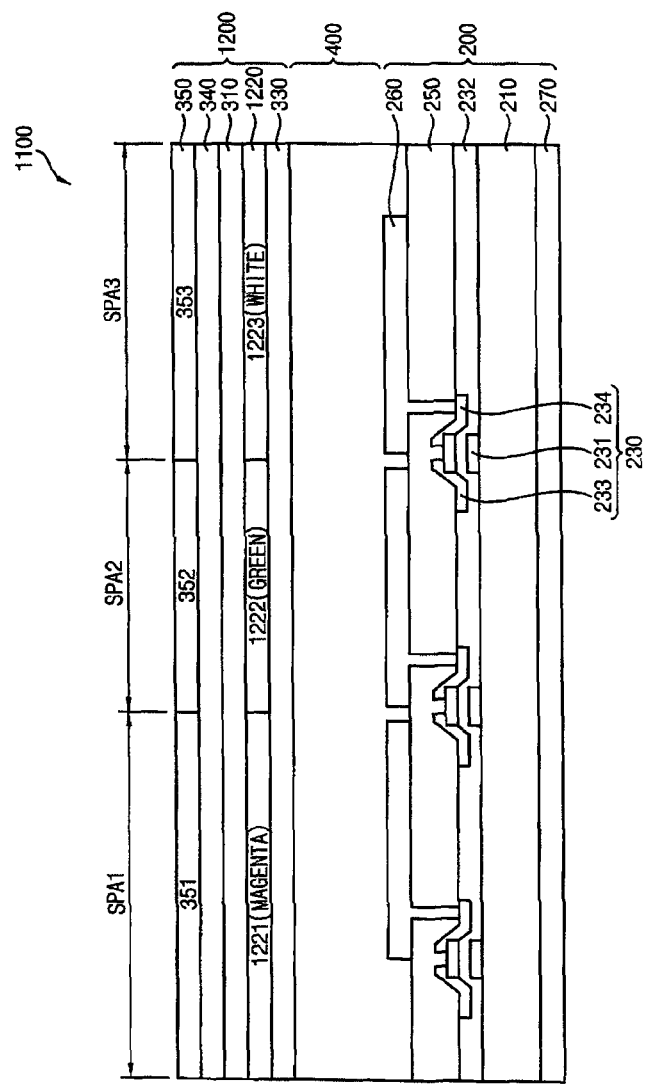

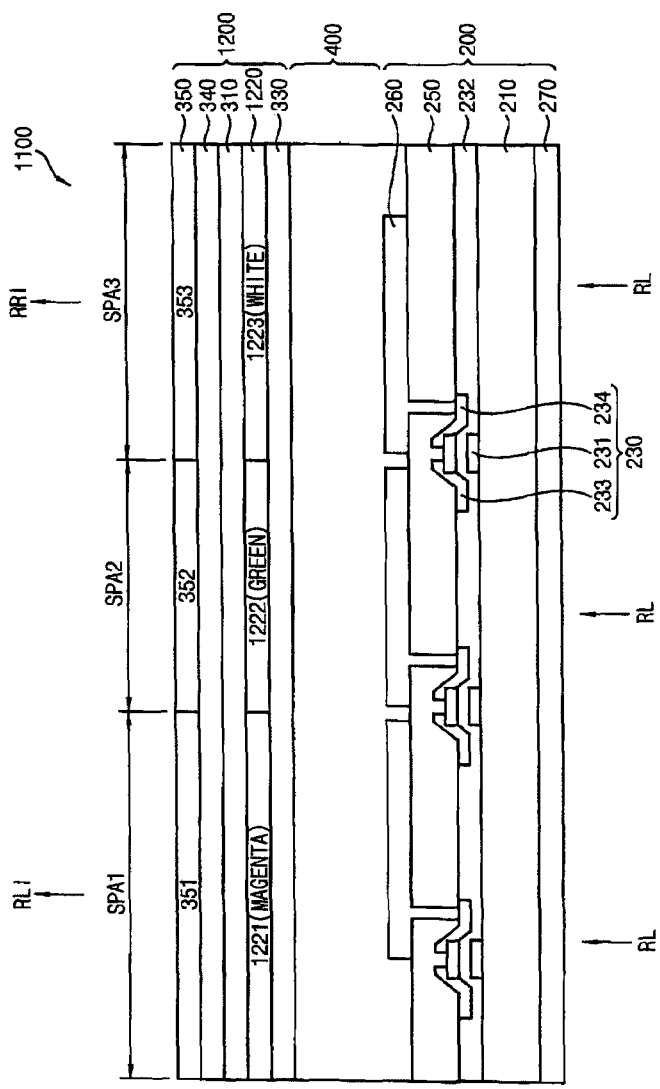

FIG. 12D

| SPA1 | SPA2 | SPA3 |
|------|------|------|
|      | \    | /    |
|      | GLl  | GRl  |

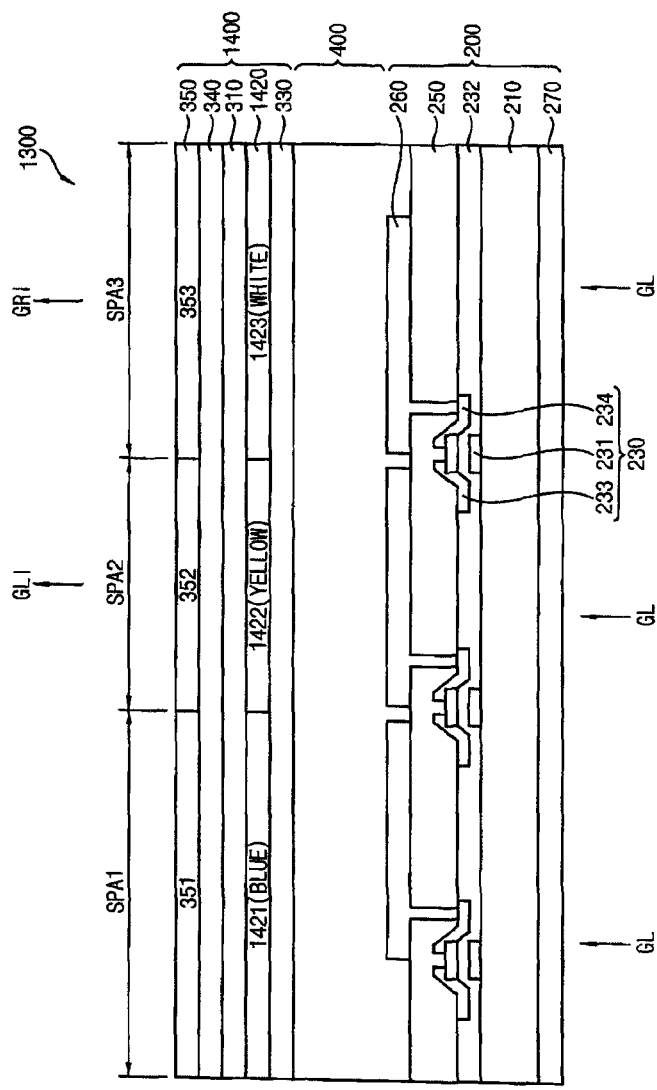

FIG. 14D

| SPA1 | SPA2 | SPA3 |
|------|------|------|
|      | GLl  | GRl  |

DISPLAY SUBSTRATE, DISPLAY PANEL AND DISPLAY APPARATUS HAVING THE DISPLAY SUBSTRATE

PRIORITY STATEMENT

This application claims priority under 35 U.S.C. §119 to Korean Patent Application No. 10-2013-0135891, filed on Nov. 8, 2013 in the Korean Intellectual Property Office (KIPO), the contents of which are herein incorporated by reference in their entireties.

BACKGROUND

1. Field

Exemplary embodiments relate to a display substrate, a display panel and a display apparatus having the display substrate. More particularly, exemplary embodiments relate to a display substrate of a display apparatus displaying a three-dimensional stereoscopic image, a display panel and a display apparatus having the display substrate.

2. Description of the Related Art

Recently, a three-dimensional stereoscopic image is displayed using a display apparatus such as a liquid crystal display apparatus as a demand for displaying the three-dimensional stereoscopic image have been increasing in video game, movie industries, etc.

A three-dimensional stereoscopic image display apparatus displays the three-dimensional stereoscopic image using a binocular parallax between two eyes of a human such as a user. For example, as two eyes of the user are spaced apart from each other, images viewed at different angles are inputted to a brain of the user. The brain of the user mixes the images so that the user may recognize the three-dimensional stereoscopic image.

However, in a method of field sequential color driving method sequentially driving a red light source, a green light source and a blue light source, three field periods are required for displaying a left-eye image and additional three field periods are required for displaying a right-eye image. For example, when one frame of an image data displayed on a display panel of the display apparatus is about 60 hertz (Hz), six field periods are required for displaying the left-eye image and the right-eye image. Thus, a high speed driving of about 360 Hz is required to the display apparatus.

SUMMARY

Exemplary embodiments provide a display substrate capable of decreasing a driving speed of a display apparatus and improving display quality of the display apparatus.

Exemplary embodiments also provide a display panel having the above-mentioned display substrate.

Exemplary embodiment also provides a display apparatus having the above-mentioned display substrate.

According to an exemplary embodiment, a display substrate includes a base substrate, a color filter layer and a retarder layer. The base substrate includes a first sub pixel area, a second sub pixel area and a third sub pixel area. The color filer layer is disposed on a front surface of the base substrate, and includes at least one of a magenta color filter, a cyan color filter and a yellow color filter in the first sub pixel area and the second sub pixel area and a white color filter in the third sub pixel area. The retarder layer is disposed on a rear surface of the base substrate opposite to the front surface of the base substrate. The retarder layer is configured to polarize light in the first sub pixel area and the second sub pixel area to form a first polarized light. The retarder layer is further configured to polarize the light in the third sub pixel area to form a second polarized light. The second polarized light is different from the first polarized light.

In one embodiment, the first sub pixel area and the second sub pixel area are configured to display a left-eye image, and the third sub pixel area is configured to display a right-eye image.

In one embodiment, the first sub pixel area and the second sub pixel area are configured to display a right-eye image, and the third sub pixel area is configured to display a left-eye image.

In one embodiment, the color filter layer may include a first color filter including the magenta color filter in the first sub pixel area, a second color filter including the cyan color filter in the second sub pixel area, and a third color filter including the white color filter in the third sub pixel area.

In one embodiment, the color filter layer may include a first color filter including the cyan color filter in the first sub pixel area, a second color filter including the yellow color filter in the second sub pixel area, and a third color filter including the white color filter in the third sub pixel area.

In one embodiment, the color filter layer may include a first color filter including the magenta color filter in the first sub pixel area, a second color filter including the yellow color filter in the second sub pixel area, and a third color filter including the white color filter in the third sub pixel area.

In one embodiment, the color filter layer may include a first color filter including a red color filter in the first sub pixel area, a second color filter including the cyan color filter in the second sub pixel area, and a third color filter including the white color filter in the third sub pixel area.

In one embodiment, the color filter layer may include a first color filter including the magenta color filter in the first sub pixel area, a second color filter including a green color filter in the second sub pixel area, and a third color filter including the white color filter in the third sub pixel area.

In one embodiment, the color filter layer includes a first color filter including a blue color filter in the first sub pixel area, a second color filter including the yellow color filter in the second sub pixel area, and a third color filter including the white color filter in the third sub pixel area.

According to another exemplary embodiment, a display panel includes a first display substrate and a second display substrate. The first display substrate includes a first base substrate including a first sub pixel area, a second sub pixel area and a third sub pixel area, a gate line and a data line formed on the first base substrate, a thin film transistor electrically connected to the gate line and the data line, and a pixel electrode electrically connected to a drain electrode of the thin film transistor. The second display substrate includes a second base substrate, a color filter layer, a common electrode, and a retarder layer. The second base substrate faces the first base substrate. The color filter layer is disposed on a front surface of the second base substrate and including at least one of a magenta color filter, a cyan color filter and a yellow color filter in the first sub pixel area and the second sub pixel area and a white color filter in the third sub pixel area. The common electrode is disposed on the color filter layer. The retarder layer is disposed on a rear surface of the second base substrate opposite to the front surface of the second base substrate. The retarder layer is configured to polarize light in the first sub pixel area and the second sub pixel area to form a first polarized light. The retarder layer is further configured to polarize the light in the third sub pixel area to form a second polarized light. The second polarized light is different from the first polarized light.

According to still another exemplary embodiment, a display apparatus includes a display panel, a gate driving part, a data driving part and a light source part. The display panel includes a first display substrate and a second display substrate. The first display substrate includes a first base substrate including a first sub pixel area, a second sub pixel area and a third sub pixel area. The first display substrate further includes a gate line and a data line formed on the first base substrate, a thin film transistor electrically connected to the gate line and the data line and a pixel electrode electrically connected to a drain electrode of the thin film transistor. The second display substrate including a second base substrate, a color filter layer, a common electrode, and a retarder layer. The second base substrate faces the first base substrate. The color filter layer is disposed on a front surface of the second base substrate and including at least one of a magenta color filter, a cyan color filter and a yellow color filter in the first sub pixel area and the second sub pixel area and a white color filter in the third sub pixel area. The common electrode is disposed on the color filter layer. The retarder layer is disposed on a rear surface of the second base substrate opposite to the front surface of the second base substrate. The retarder layer is configured to polarize light in the first sub pixel area and the second sub pixel area to form a first polarized light. The retarder layer is further configured to polarize the light in the third sub pixel area to form a second polarized light. The second polarized light is different from the first polarized light. The gate driving part is configured to output a gate signal to the gate line. The data driving part is configured to output a data signal to the data line. The light source part is configured to provide the light to the display panel.

In one embodiment, the light source part is configured to provide a red light to the display panel in a first field, a green light to the display panel in a second field next to the first field, and a blue light to the display panel in a third field next to the second field.

In one embodiment, the light source part is configured to provide a yellow light to the display panel in a first field and a blue light to the display panel in a second field next to the first field.

In one embodiment, the first sub pixel area and the second sub pixel area are configured to display a left-eye image or a right-eye image, and the third sub pixel area is configured to display the right-eye image or the left-eye image differently from the first sub pixel area and the second sub pixel area.

In one embodiment, the color filter layer may include a first color filter including the magenta color filter in the first sub pixel area, a second color filter including the cyan color filter in the second sub pixel area, and a third color filter including the white color filter in the third sub pixel area.

In one embodiment, the color filter layer may include a first color filter including the cyan color filter in the first sub pixel area, a second color filter including the yellow color filter in the second sub pixel area, and a third color filter including the white color filter in the third sub pixel area.

In one embodiment, the color filter layer may include a first color filter including the magenta color filter in the first sub pixel area, a second color filter including the yellow color filter in the second sub pixel area, and a third color filter including the white color filter in the third sub pixel area.

In one embodiment, the color filter layer may include a first color filter including a red color filter in the first sub pixel area, a second color filter including the cyan color filter in the second sub pixel area, and a third color filter including the white color filter in the third sub pixel area.

In one embodiment, the color filter layer may include a first color filter including the magenta color filter in the first sub pixel area, a second color filter including a green color filter in the second sub pixel area, and a third color filter including the white color filter in the third sub pixel area.

In one embodiment, the color filter layer may include a first color filter including a blue color filter in the first sub pixel area, a second color filter including the yellow color filter in the second sub pixel area, and a third color filter including the white color filter in the third sub pixel area.

According to the inventive concept, a three-dimensional stereoscopic image is displayed during first, second and third field periods in a field sequential color driving method, therefore a high speed driving is not required to a display apparatus. Thus, a driving speed of the display apparatus displaying the three-dimensional stereoscopic image may be decreased.

In addition, a left-eye image and a right-eye image respectively having a first polarization and a second polarization different from each other is displayed in a unit pixel including first, second and third sub pixels, therefore a deterioration of a resolution may be prevented. Thus, display quality of the display apparatus displaying the three-dimensional stereoscopic image may be improved.

BRIEF DESCRIPTION OF THE DRAWINGS

The above and other features and advantages of the inventive concept will become more apparent by describing in detailed example embodiments thereof with reference to the accompanying drawings, in which:

FIGS. 3A, 3B, 3C, 3D, 3E, 3F are sequential diagrams illustrating a method of displaying a three-dimensional stereoscopic image using the display panel of FIGS. 1 and 2;

FIGS. 4A, 4B, 4C, 4D are sequential diagrams illustrating a method of displaying a two-dimensional plane image using the display panel of FIGS. 1 and 2;

FIGS. 6A, 6B, 6C, 6D, 6E, 6F are sequential diagrams illustrating a method of displaying the three-dimensional stereoscopic image using the display panel of FIG. 5;

FIGS. 8A, 8B, 8C, 8D, 8E, 8F are sequential diagrams illustrating a method of displaying the three-dimensional stereoscopic image using the display panel of FIG. 7;

FIGS. 10A, 10B, 10C, 10D, 10E, 10F are sequential diagrams illustrating a method of displaying the three-dimensional stereoscopic image using the display panel of FIG. 9;

FIG. 11 is a cross-sectional view illustrating a display panel according to still another exemplary embodiment;

FIGS. 12A, 12B, 12C, 12D, 12E, 12F are sequential diagrams illustrating a method of displaying the three-dimensional stereoscopic image using the display panel of FIG. 11;

FIGS. 14A, 14B, 14C, 14D, 14E, 14F are sequential diagrams illustrating a method of displaying the three-dimensional stereoscopic image using the display panel of FIG. 13.

DETAILED DESCRIPTION

Hereinafter, embodiments will be explained in detail with reference to the accompanying drawings.

Figure 1:
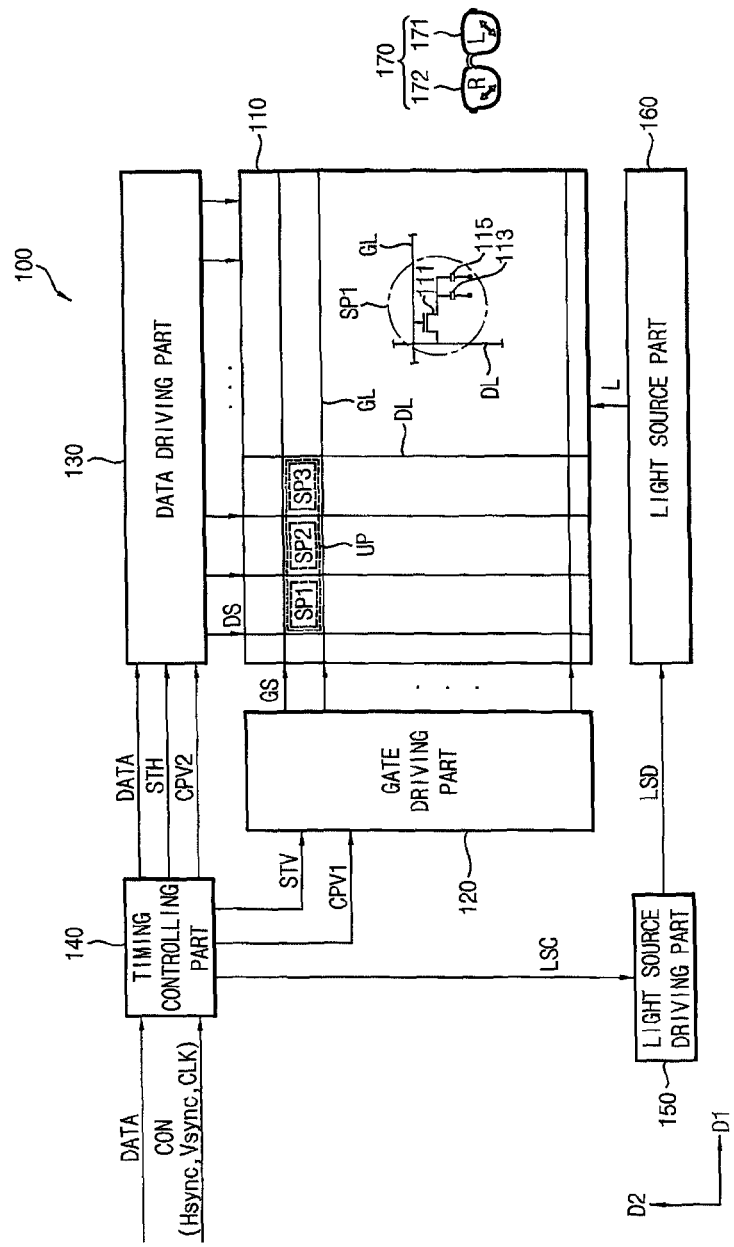
FIG. 1 is a block diagram illustrating a display apparatus according to an exemplary embodiment.

FIG. 1 is a block diagram illustrating a display apparatus according to an exemplary embodiment.

Referring to FIG. 1, the display apparatus 100 according to the present exemplary embodiment includes a display panel 110, a gate driving part 120, a data driving part 130, a timing controlling part 140, a light source driving part 150 and a light source part 160.

The display panel 110 receives a data signal DS based on an image data DATA to display an image. For example, the image data DATA may be two-dimensional plane image data. Alternatively, the image data DATA may include a left-eye image data and a right-eye image data for displaying a three-dimensional stereoscopic image.

The display panel 110 includes gate lines GL, data lines DL and a plurality of unit pixels UP. The gate line GL extends in a first direction D1 and the data line DL extends in a second direction D2 substantially perpendicular to the first direction D1. Each of the unit pixels UP includes a first sub pixel SP1, a second sub pixel SP2 and a third sub pixel SP3. The first sub pixel SP1 includes a thin film transistor 111 electrically connected to the gate line GL and the data line DL, a liquid crystal capacitor 113 and a storage capacitor 115 connected to the thin film transistor 111. Each of a structure of the second sub pixel SP2 and a structure of the third sub pixel SP3 is substantially the same as a structure of the first sub pixel SP1.

The gate driving part 120 generates a gate signal GS in response to a gate start signal STV and a gate clock signal CPV1 provided from the timing controlling part 140, and outputs the gate signal GS to the gate line GL. Specifically, the gate driving part 120 increases the gate signal GS from a gate off voltage to a gate on voltage in response to an activation of the gate start signal STV and the gate clock signal CPV1. In addition, the gate driving part 120 decreases the gate signal GS to the gate off voltage in response to a deactivation of the gate clock signal CPV1. For example, the gate off voltage may be about −7.5 volts (V) to about −6.5 volts (V), and the gate on voltage may be about 28 volts (V) to about 31 volts (V).

The data driving part 130 outputs the data signal DS based on the image data DATA to the data line DL, in response to a data start signal STH and a data clock signal CPV2 provided from the timing controlling part 140.

The timing controlling part 140 receives the image data DATA and a control signal CON from an outside. The control signal CON may include a horizontal synchronous signal Hsync, a vertical synchronous signal Vsync and a clock signal CLK. The timing controlling part 140 generates the data start signal STH using the horizontal synchronous signal Hsync and outputs the data start signal STH to the data driving part 130. In addition, the timing controlling part 140 generates the gate start signal STV using the vertical synchronous signal Vsync and outputs the gate start signal STV to the gate driving part 120. In addition, the timing controlling part 140 generates the gate clock signal CPV1 and the data clock signal CPV2 using the clock signal CLK, outputs the gate clock signal CLK1 to the gate driving part 120 and outputs the data clock signal CPV2 to the data driving part 130. The timing controlling part 140 may further output a light source control signal LSC controlling a driving of the light source part 160.

The light source driving part 150 outputs a light source driving signal LSD driving the light source part 160 to the light source part 160 in response to the light source control signal LSC received from the timing controlling part 140.

The light source part 160 generates a light L in response to the light source driving signal LSD received from the light source driving part 150 to provide the light L to the display panel 110. The light source part 160 outputs the light L to the display panel 110 in a method of field sequential color driving method. For example, the light source part 160 may sequentially provide a red light, a green light and a blue light to the display panel 110. Alternatively, the light source part 160 may sequentially provide a yellow light and the blue light to the display panel 110. The light source part 160 may include a light emitting diode (LED) generating the light L.

Figure 2:
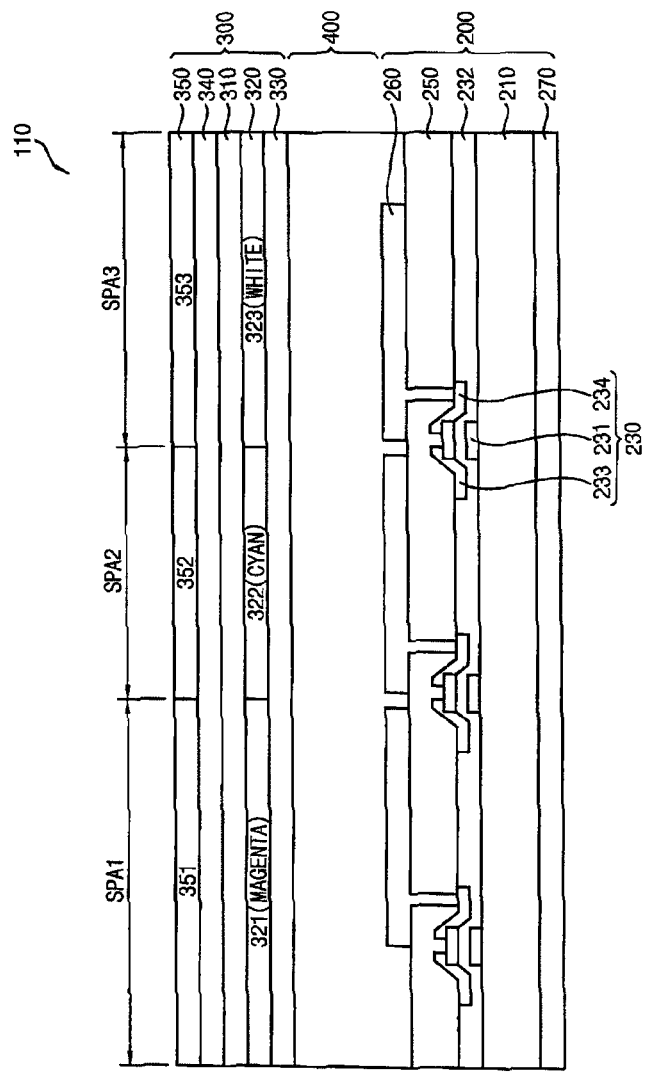
FIG. 2 is a cross sectional view illustrating a unit pixel in a display panel of FIG. 1.

FIG. 2 is a cross sectional view illustrating the unit pixel UP in the display panel 110 of FIG. 1.

Referring to FIGS. 1 and 2, the display panel 110 includes a first display substrate 200, a second display substrate 300 and a liquid crystal layer 400.

The first display substrate 200 includes a first base substrate 210, a thin film transistor 230, an organic insulating layer 250 and a pixel electrode 260.

The first base substrate 210 includes a first sub pixel area SPA1 in which the first sub pixel SP1 is formed, a second sub pixel area SPA2 in which the second sub pixel SP2 is formed, and a third sub pixel area SPA3 in which the third sub pixel SP3 is formed. The first sub pixel area SPA1 and the second sub pixel area SPA2 may be an area displaying a left-eye image of the three-dimensional stereoscopic image and the third sub pixel area SPA3 may be an area displaying a right-eye image of the three-dimensional stereoscopic image.

The thin film transistor 230 is formed on a front surface of the first base substrate 210, and includes a gate electrode 231 protruded from the gate line GL, a gate insulating layer 232 covering the gate electrode 231, a source electrode 233 protruded from the data line DL, and a drain electrode 234 spaced apart from the source electrode 233. The organic insulating layer 250 covers the thin film transistor 230. The pixel electrode 260 is formed on the organic insulating layer 250 and is electrically connected to the drain electrode 234 of the thin film transistor 230 through a contact hole formed through the organic insulating layer 250. The first display substrate 200 may further include a first polarizing plate 270 formed a rear surface of the first base substrate 210 and selecting a linearly polarized light.

The second display substrate 300 includes a second base substrate 310 facing the first base substrate 210, a color filter layer 320 formed on a front surface of the second base substrate 310, a common electrode 330 formed on the color filter layer 320, and a retarder layer 350 formed on a rear surface of the second base substrate 310.

The color filter layer 320 includes a first color filter 321 formed in the first sub pixel area SPA1, a second color filter 322 formed in the second sub pixel area SPA2, and a third color filter 323 formed in the third sub pixel area SPA3. The first color filter 321 and the second color filter 322 include at least one of a magenta color filter, a cyan color filter and a yellow color filter, and the third color filter 323 includes a white color filter. For example, the first color filter 321 may be the magenta color filter, the second color filter 322 may be the cyan color filter and the third color filter 323 may be the white color filter.

The retarder layer 350 includes a first retarder portion 351 formed in the first sub pixel area SPA1, a second retarder portion 352 formed in the second sub pixel area SPA2 and a third retarder portion 353 formed in the third sub pixel area SPA3. The first retarder portion 351 and the second retarder portion 352 transmit a first polarized light. Therefore, the first retarder portion 351 converts light transmitting the first color filter 321 into the first polarized light in the first sub pixel area SPA1 and the second retarder portion 352 converts light transmitting the second color filer 322 into the first polarized light in the second sub pixel area SPA2. Thus, the first retarder portion 351 first polarizes the light transmitting the first color filter 321 in the first sub pixel area SPA1 and the second retarder portion 352 first polarizes the light transmitting the second color filer 322 in the second sub pixel area SPA2. The third retarder portion 353 transmits a second polarized light different from the first polarized light. Therefore, the third retarder portion 353 converts light transmitting the third color filter 323 into the second polarized light in the third sub pixel area SPA3. Thus, the third retarder portion 353 second polarizes the light transmitting the third color filter 323 in the third sub pixel area SPA3. The first polarized light and the second polarized light may cross each other. The retarder layer 350 may include a film patterned retarder.

The second display substrate 300 may include a second polarizing plate 340 formed between the second base substrate 310 and the retarder layer 350 and selecting the linearly polarized light.

The liquid crystal layer 400 is interposed between the first display substrate 200 and the second display substrate 300. The liquid crystal layer 400 includes a liquid crystal of which an alignment is changed by an electric field between the pixel electrode 260 of the first display substrate 200 and the common electrode 330 of the second display substrate 300.

Referring to FIG. 1 again, the display apparatus 100 may further include a polarizing glass 170.

The polarizing glass 170 includes a left-eye glass portion 171 and a right-eye glass portion 172. The left-eye glass portion 171 has a light absorbing axis substantially the same as an axis of the first retarder portion 351 and an axis of the second retarder portion 352. Thus, the left-eye glass portion 171 transmits the first polarized light. The right-eye glass portion 172 has a light absorbing axis substantially the same as an axis of the third retarder portion 353. Thus, the right-eye glass portion 172 transmits the second polarized light.

FIGS. 3A to 3F are sequential diagrams illustrating a method of displaying the three-dimensional stereoscopic image using the display panel 110 of FIGS. 1 and 2.

Figure 3A:
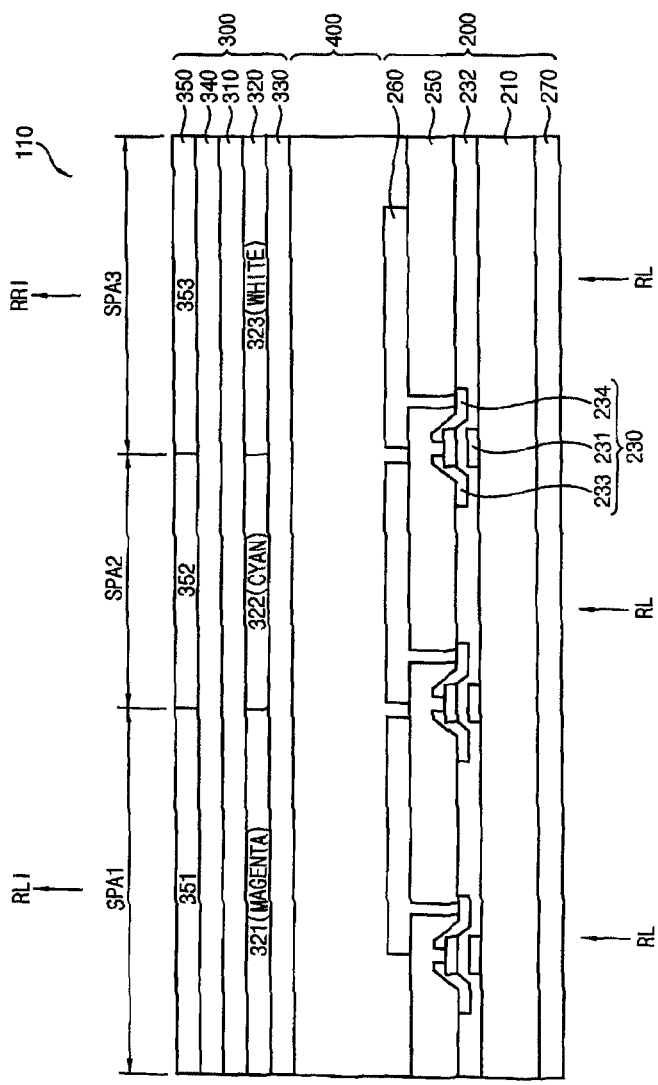
Figure 3B:
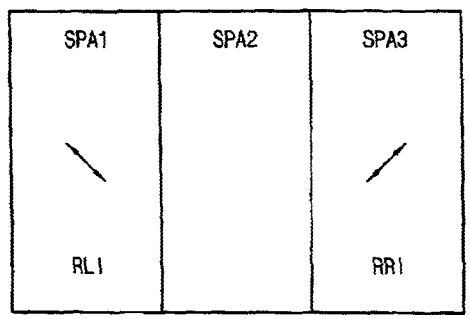

Referring to FIGS. 3A and 3B, a red light RL is provided to the display panel 110. Specifically, the light source part 160 outputs the red line RL to the display panel 110 during a first field period of a frame period. The red light RL transmits through the first color filter 321 including the magenta color filter in the first sub pixel area SPA1 and is converted into the first polarized light by the first retarder portion 351. Thus, a red left-eye image RL1 is displayed in the first sub pixel area SPA1. In addition, the red light RL transmits through the third color filter 323 including the white color filter and is converted into the second polarized light by the third retarder portion 353. Thus, a red right-eye image RR1 is displayed in the third sub pixel area SPA3. In the figures generally, various lights are absorbed by particular color filters and thus do not pass through the particular color filters. For example, in FIG. 3A, the red light RL is absorbed by the second color filter 322 including the cyan color filter in the second sub pixel area SPA2 and thus does not pass through the second color filter 322.

Figure 3C:
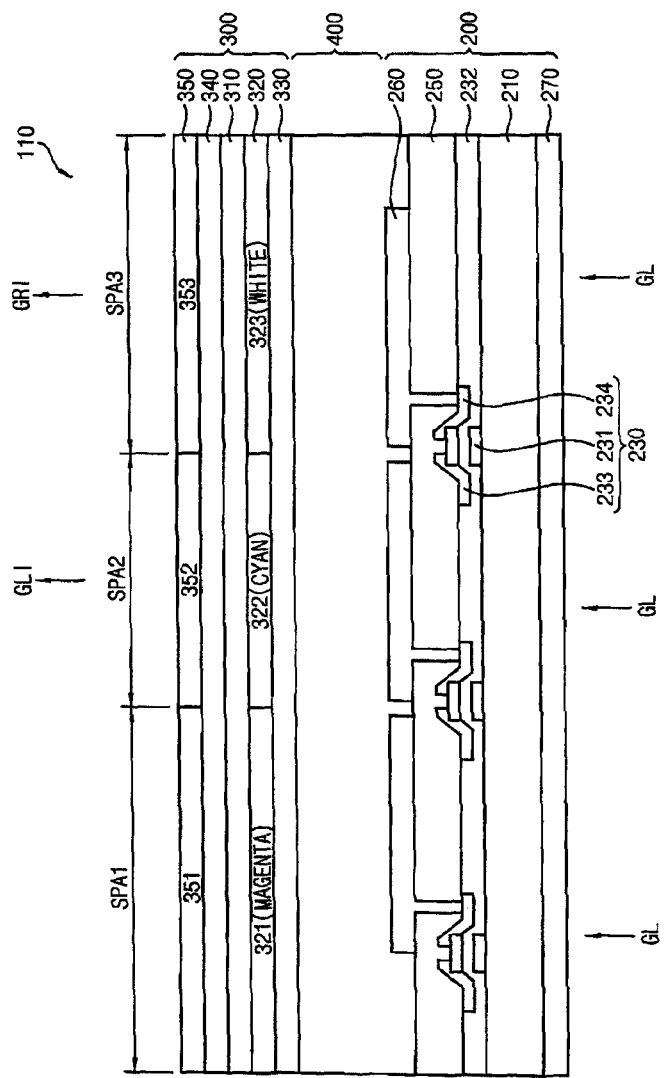
Figure 3D:
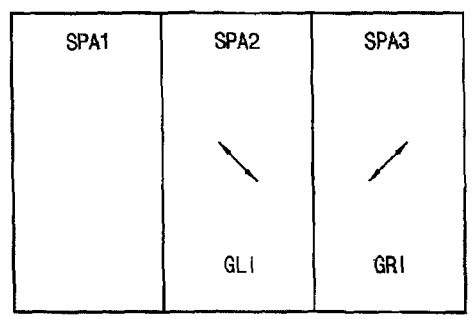

Referring to FIGS. 3C and 3D, a green light GL is provided to the display panel 110. Specifically, the light source part 160 outputs the green light GL to the display panel 110 during a second field period next to the first field period of the frame period. The green light GL transmits through the second color filter 322 including the cyan color filter in the second sub pixel area SPA2 and is converted into the first polarized light by the second retarder portion 352. Thus, a green left-eye image GL is displayed in the second sub pixel area SPA2. In addition, the green light GL transmits through the third color filter 323 including the white color filter and is converted into the second polarized light by the third retarder portion 353. Thus, a green right-eye image GRI is displayed in the third sub pixel area SPA3.

Figure 3F:
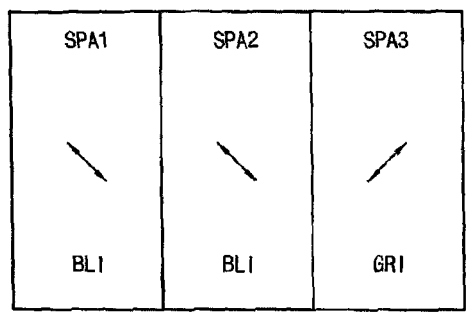

Referring to FIGS. 3E and 3F, a blue light BL is provided to the display panel 110. Specifically, the light source part 160 outputs the blue light BL to the display panel 110 during a third field period next to the second field period of the frame period. The blue light BL transmits through the first color filter 321 including the magenta color filter in the first sub pixel area SPA1 and is converted into the first polarized light by the first retarder portion 351. Thus, a blue left-eye image BL1 is displayed in the first sub pixel area SPA1. In addition, the blue light BL transmits through the second color filter 322 including the cyan color filter in the second sub pixel area SPA2 and is converted into the first polarized light by the second retarder portion 352. Thus, the blue left-eye image BL1 is displayed in the second sub pixel area SPA2. In addition, the blue light BL transmits through the third color filter 323 including the white color filter and is converted into the second polarized light by the third retarder portion 353. Thus, a blue right-eye image BR1 is displayed in the third sub pixel area SPA3. Thus, the three-dimensional stereoscopic image is displayed.

FIGS. 4A to 4D are sequential diagrams illustrating a method of displaying a two-dimensional plane image using the display panel 110 of FIGS. 1 and 2.

Figure 4B:
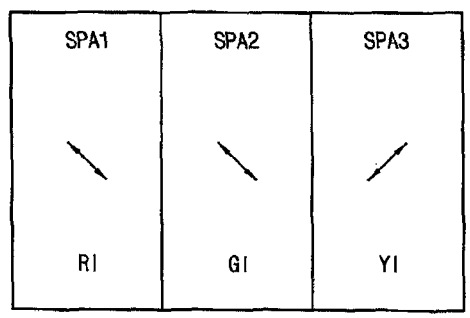

Referring to FIGS. 4A and 4B, a yellow light YL is provided to the display panel 110. Specifically, the light source part 160 outputs the yellow light YL to the display panel 110 during a first field period of a frame period. The yellow light YL transmits through the first color filter 321 including the magenta color filter in the first sub pixel area SPA1 and is converted into the first polarized light by the first retarder portion 351. Thus, a red image RI is displayed in the first sub pixel area SPA1. In addition, the yellow light YL transmits through the second color filter 322 including the cyan color filter in the second sub pixel area SPA2 and is converted into the first polarized light by the second retarder portion 352. Thus, a green image GI is displayed in the second sub pixel area SPA2. In addition, the yellow light YL transmits through the third color filter 323 including the white color filter in the third sub pixel area SPA3 and is converted into the second polarized light by the third retarder portion 353. Thus, a yellow image YI is displayed in the third sub pixel area SPA3.

Figure 4C:
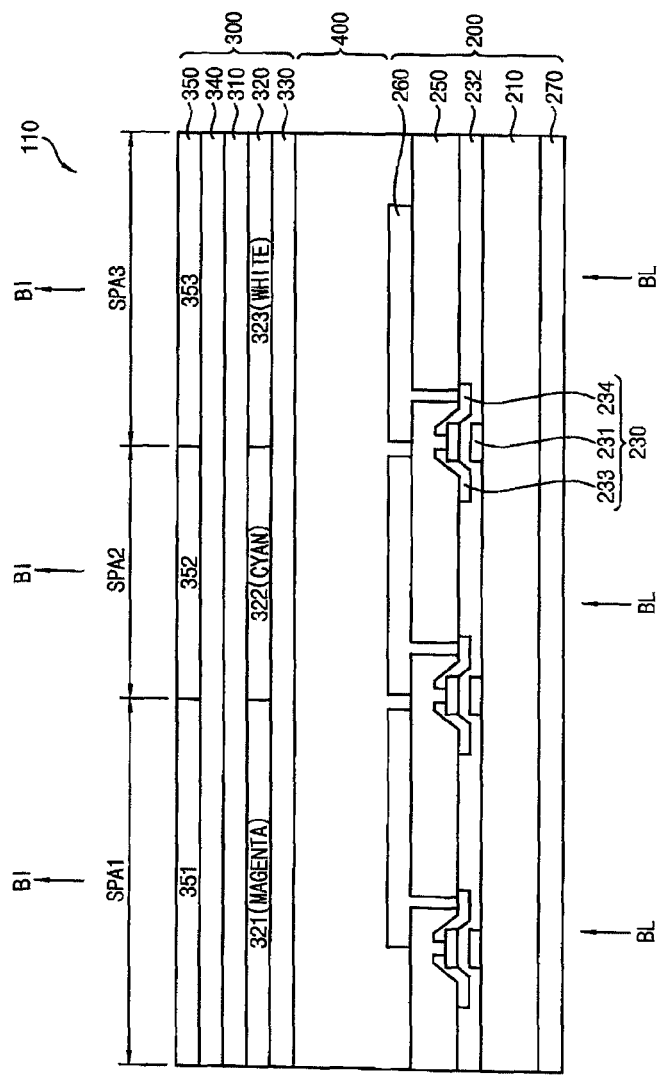
Figure 4D:
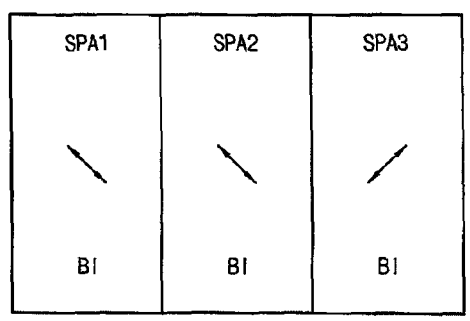

Referring to FIGS. 4C and 4D, a blue light BL is provided to the display panel 110. Specifically, the light source part 160 outputs the blue light BL to the display panel 110 during a second field period next to the first field period of the frame period. The blue light BL transmits through the first color filter 321 including the magenta color filter in the first sub pixel area SPA1 and is converted into the first polarized light by the first retarder portion 351. Thus, a blue image B1 is displayed in the first sub pixel area SPA1. In addition, the blue light BL transmits through the second color filter 322 including the cyan color filter in the second sub pixel area SPA2 and is converted into the first polarized light by the second retarder portion 352. Thus, a blue image BI is displayed in the second sub pixel area SPA2. In addition, the blue light BL transmits through the third color filter 323 including the white color filter in the third sub pixel area SPA3 and is converted into the second polarized light by the third retarder portion 353. Thus, a blue image BI is displayed in the third sub pixel area SPA3. Thus, the two-dimensional plane image is displayed.

In the present exemplary embodiment, the left-eye image is displayed in the first sub pixel area SPA1 and the second sub pixel area SPA2 and the right-eye image is displayed in the third sub pixel area SPA3, but it is not limited thereto. For example, the right-eye image may be displayed in the first sub pixel area SPA1 and the second sub pixel area SPA2 and the left-eye image may be displayed in the third sub pixel area SPA3.

According to the present exemplary embodiment, the three-dimensional stereoscopic image is displayed during the first, second and third field periods in the field sequential color driving method, therefore a high speed driving is not required to the display apparatus 100. Thus, a driving speed of the display apparatus 100 may be decreased.

In addition, the left-eye image and the right-eye image respectively having the first polarization and the second polarization different from each other is displayed in the unit pixel UP including the first, second and third sub pixels SP1, SP2 and SP3, therefore a deterioration of a resolution may be prevented. Thus, display quality of the display apparatus 100 may be improved.

Figure 5:
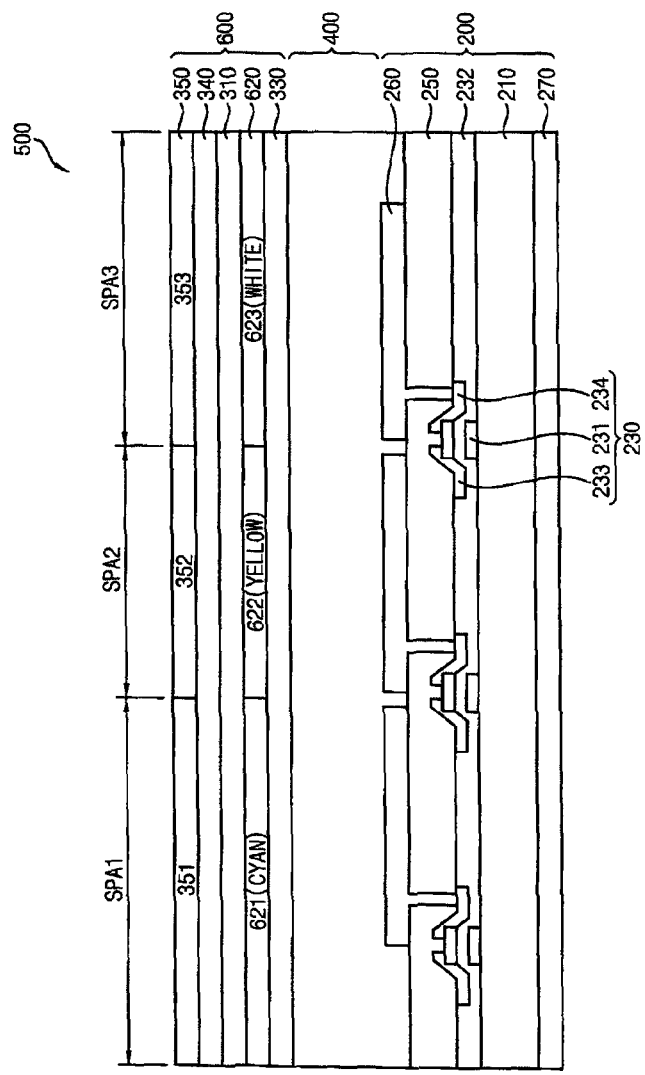
FIG. 5 is a cross-sectional view illustrating a display panel according to another exemplary embodiment.

FIG. 5 is a cross-sectional view illustrating a display panel according to another exemplary embodiment.

The display panel 500 according to the present exemplary embodiment may be in the display apparatus 100 according to the previous exemplary embodiment illustrated in FIG. 1. In addition, the display panel 500 according to the present exemplary embodiment is substantially the same as the display panel 110 according to the previous exemplary embodiment illustrated in FIG. 2 except for the second display substrate 300. Thus, the same reference numerals will be used to refer to same or like parts as those described in the previous example embodiment and any further repetitive explanation concerning the above elements will be omitted.

Referring to FIG. 5, the display panel 500 according to the present exemplary embodiment includes the first display substrate 200, a second display substrate 600 and the liquid crystal layer 400.

The second display substrate 600 includes the second base substrate 310 facing the first base substrate 210, a color filter layer 620 formed on the front surface of the second base substrate 310, the common electrode 330 formed on the color filter layer 620, and the retarder layer 350 formed on the rear surface of the second base substrate 310.

The color filter layer 620 includes a first color filter 621 formed in the first sub pixel area SPA1, a second color filter 622 formed in the second sub pixel area SPA2, and a third color filter 623 formed in the third sub pixel area SPA3. The first color filter 621 and the second color filter 622 include at least one of the magenta color filter, the cyan color filter and the yellow color filter, and the third color filter 623 includes the white color filter. For example, the first color filter 621 may be the cyan color filter, the second color filter 622 may be the yellow color filter and the third color filter 623 may be the white color filter.

FIGS. 6A to 6F are sequential diagrams illustrating a method of displaying the three-dimensional stereoscopic image using the display panel 500 of FIG. 5.

Figure 6B:
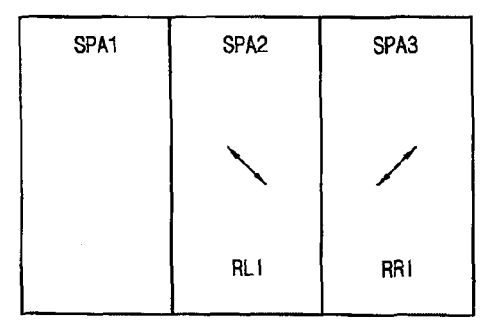

Referring to FIGS. 6A and 6B, the red light RL is provided to the display panel 500. Specifically, the light source part 160 outputs the red line RL to the display panel 500 during the first field period of the frame period. The red light RL transmits through the second color filter 622 including the yellow color filter in the second sub pixel area SPA2 and is converted into the first polarized light by the second retarder portion 352. Thus, the red left-eye image RL1 is displayed in the second sub pixel area SPA2. In addition, the red light RL transmits through the third color filter 623 including the white color filter and is converted into the second polarized light by the third retarder portion 353. Thus, the red right-eye image RR1 is displayed in the third sub pixel area SPA3.

Figure 6D:
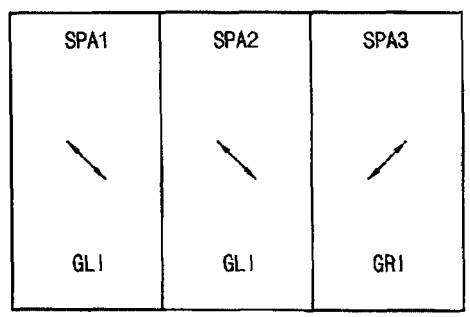

Referring to FIGS. 6C and 6D, the green light GL is provided to the display panel 500. Specifically, the light source part 160 outputs the green light GL to the display panel 500 during the second field period next to the first field period of the frame period. The green light GL transmits through the first color filter 621 including the cyan color filter in the first sub pixel area SPA1 and is converted into the first polarized light by the first retarder portion 351. Thus, the green left-eye image GL1 is displayed in the first sub pixel area SPA1. In addition, the green light GL transmits through the second color filter 622 including the yellow color filter in the second sub pixel area SPA2 and is converted into the first polarized light by the second retarder portion 352. Thus, the green left-eye image GL1 is displayed in the second sub pixel area SPA2. In addition, the green light GL transmits through the third color filter 623 including the white color filter and is converted into the second polarized light by the third retarder portion 353. Thus, the green right-eye image GRI is displayed in the third sub pixel area SPA3.

Figure 6E:
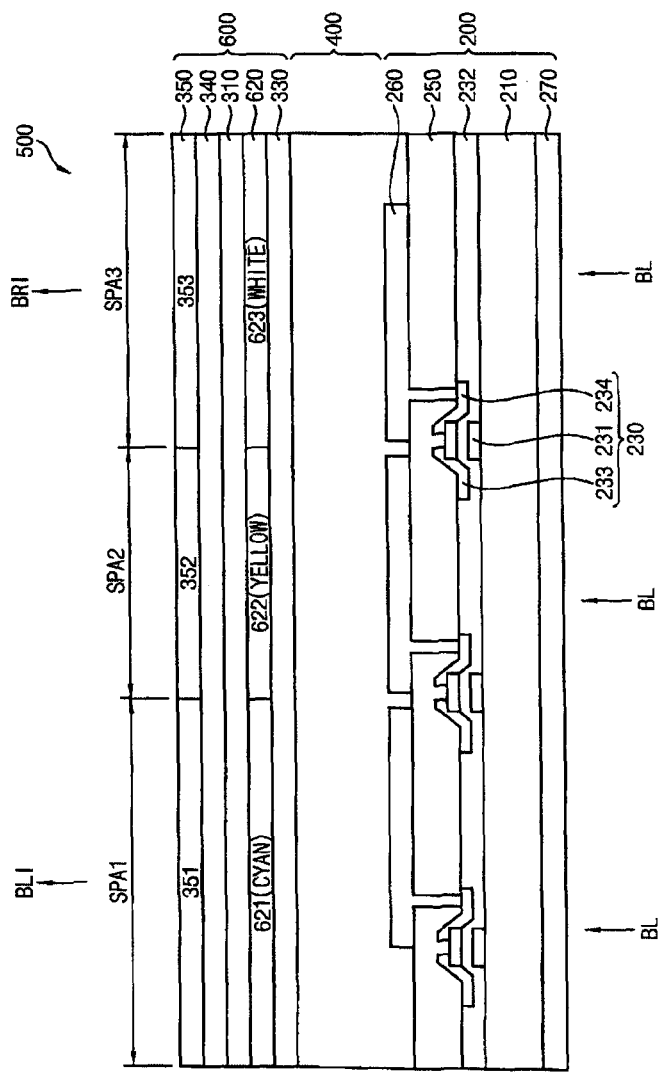
Figure 6F:
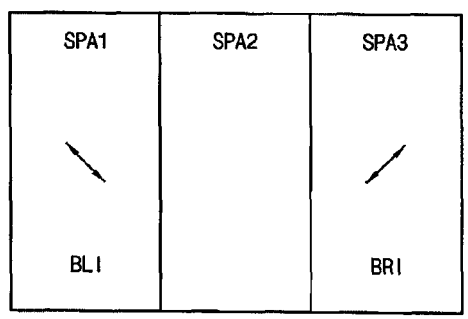

Referring to FIGS. 6E and 6F, the blue light BL is provided to the display panel 500. Specifically, the light source part 160 outputs the blue light BL to the display panel 500 during the third field period next to the second field period of the frame period. The blue light BL transmits through the first color filter 621 including the cyan color filter in the first sub pixel area SPA1 and is converted into the first polarized light by the first retarder portion 351. Thus, the blue left-eye image BL1 is displayed in the first sub pixel area SPA1. In addition, the blue light BL transmits through the third color filter 623 including the white color filter and is converted into the second polarized light by the third retarder portion 353. Thus, the blue right-eye image BR1 is displayed in the third sub pixel area SPA3. Thus, the three-dimensional stereoscopic image is displayed.

According to the present exemplary embodiment, the three-dimensional stereoscopic image is displayed during the first, second and third field periods in the field sequential color driving method, therefore a high speed driving is not required to the display apparatus 100 including the display panel 500. Thus, a driving speed of the display apparatus 100 may be decreased.

In addition, the left-eye image and the right-eye image respectively having the first polarization and the second polarization different from each other is displayed in the unit pixel UP including the first, second and third sub pixels SP1, SP2 and SP3, therefore a deterioration of a resolution may be prevented. Thus, display quality of the display apparatus 100 including the display panel 500 may be improved.

Figure 7:
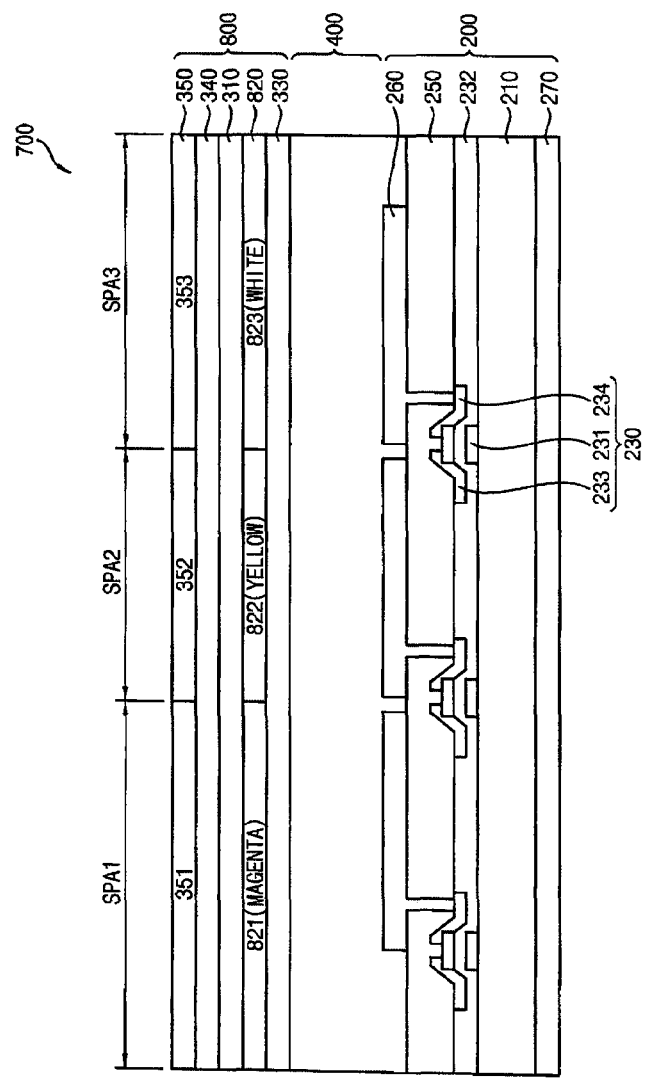
FIG. 7 is a cross-sectional view illustrating a display panel according to still another exemplary embodiment.

FIG. 7 is a cross-sectional view illustrating a display panel according to still another exemplary embodiment.

The display panel 700 according to the present exemplary embodiment may be in the display apparatus 100 according to the previous exemplary embodiment illustrated in FIG. 1. In addition, the display panel 700 according to the present exemplary embodiment is substantially the same as the display panel 110 according to the previous exemplary embodiment illustrated in FIG. 2 except for the second display substrate 300. Thus, the same reference numerals will be used to refer to same or like parts as those described in the previous example embodiment and any further repetitive explanation concerning the above elements will be omitted.

Referring to FIG. 7, the display panel 700 according to the present exemplary embodiment includes the first display substrate 200, a second display substrate 800 and the liquid crystal layer 400.

The second display substrate 800 includes the second base substrate 310 facing the first base substrate 210, a color filter layer 820 formed on the front surface of the second base substrate 310, the common electrode 330 formed on the color filter layer 820, and the retarder layer 350 formed on the rear surface of the second base substrate 310.

The color filter layer 820 includes a first color filter 821 formed in the first sub pixel area SPA1, a second color filter 822 formed in the second sub pixel area SPA2, and a third color filter 823 formed in the third sub pixel area SPA3. The first color filter 821 and the second color filter 822 include at least one of the magenta color filter, the cyan color filter and the yellow color filter, and the third color filter 823 includes the white color filter. For example, the first color filter 821 may be the magenta color filter, the second color filter 822 may be the yellow color filter and the third color filter 823 may be the white color filter.

FIGS. 8A to 8F are sequential diagrams illustrating a method of displaying the three-dimensional stereoscopic image using the display panel 700 of FIG. 7.

Figure 8B:
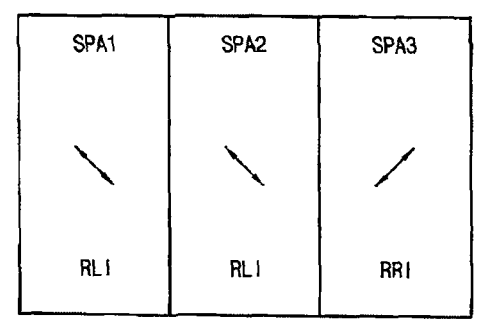

Referring to FIGS. 8A and 8B, the red light RL is provided to the display panel 700. Specifically, the light source part 160 outputs the red line RL to the display panel 700 during the first field period of the frame period. The red light RL transmits through the first color filter 821 including the magenta color filter in the first sub pixel area SPA1 and is converted into the first polarized light by the first retarder portion 351. Thus, the red left-eye image RL1 is displayed in the first sub pixel area SPA1. In addition, the red light RL transmits through the second color filter 822 including the yellow color filter in the second sub pixel area SPA2 and is converted into the first polarized light by the second retarder portion 352. Thus, the rod left-eye image RL1 is displayed in the second sub pixel area SPA2. In addition, the red light RL transmits through the third color filter 823 including the white color filter and is converted into the second polarized light by the third retarder portion 353. Thus, the red right-eye image RR1 is displayed in the third sub pixel area SPA3.

Figure 8C:
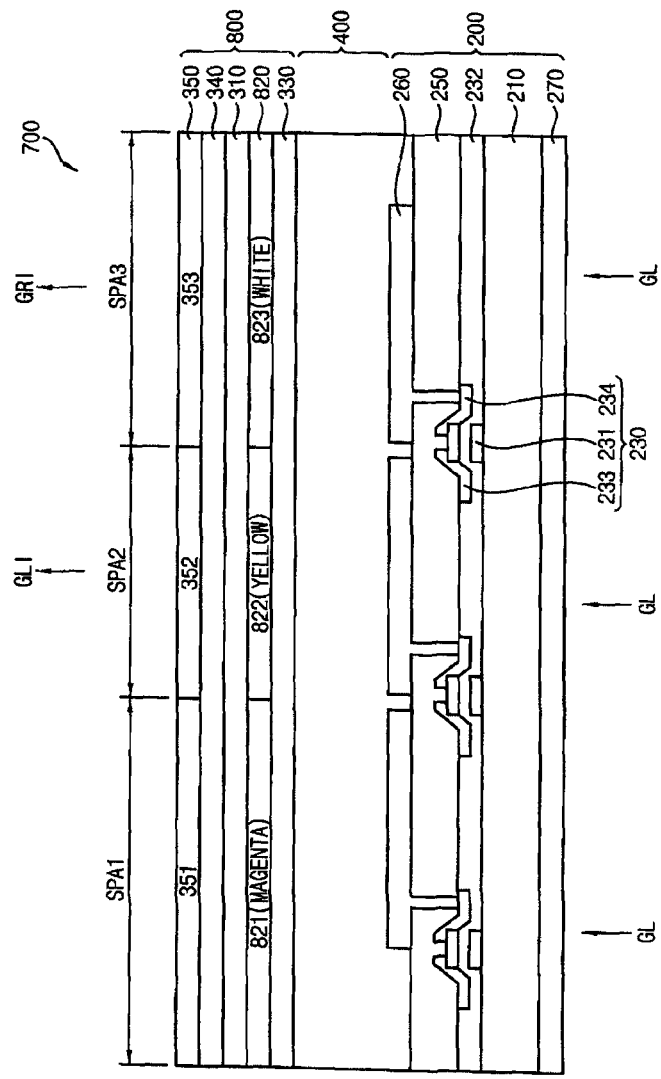
Figure 8D:
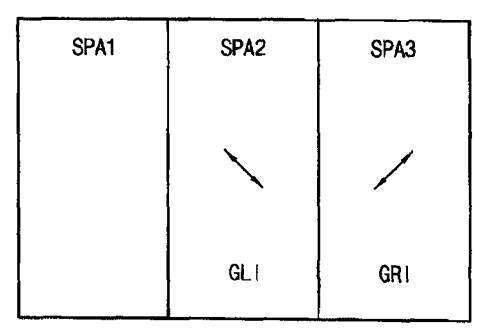

Referring to FIGS. 8C and 8D, the green light GL is provided to the display panel 700. Specifically, the light source part 160 outputs the green light GL to the display panel 700 during the second field period next to the first field period of the frame period. The green light GL transmits through the second color filter 822 including the yellow color filter in the second sub pixel area SPA2 and is converted into the first polarized light by the second retarder portion 352. Thus, the green left-eye image GL1 is displayed in the second sub pixel area SPA2. In addition, the green light GL transmits through the third color filter 823 including the white color filter and is converted into the second polarized light by the third retarder portion 353. Thus, the green right-eye image GRI is displayed in the third sub pixel area SPA3.

Figure 8F:
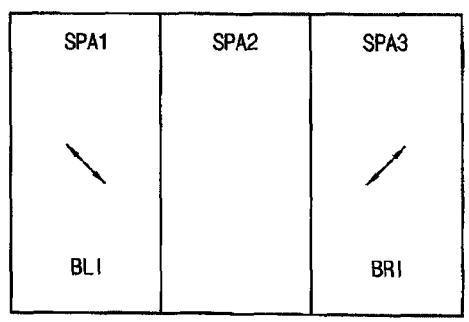

Referring to FIGS. 8E and 8F, the blue light BL is provided to the display panel 700. Specifically, the light source part 160 outputs the blue light BL to the display panel 700 during the third field period next to the second field period of the frame period. The blue light BL transmits through the first color filter 821 including the magenta color filter in the first sub pixel area SPA1 and is converted into the first polarized light by the first retarder portion 351. Thus, the blue left-eye image BL1 is displayed in the first sub pixel area SPA1. In addition, the blue light BL transmits through the third color filter 823 including the white color filter and is converted into the second polarized light by the third retarder portion 353. Thus, the blue right-eye image BR1 is displayed in the third sub pixel area SPA3. Thus, the three-dimensional stereoscopic image is displayed.

According to the present exemplary embodiment, the three-dimensional stereoscopic image is displayed during the first, second and third field periods in the field sequential color driving method, therefore a high speed driving is not required to the display apparatus 100 including the display panel 700. Thus, a driving speed of the display apparatus 100 may be decreased.

In addition, the left-eye image and the right-eye image respectively having the first polarization and the second polarization different from each other is displayed in the unit pixel UP including the first, second and third sub pixels SP1, SP2 and SP3, therefore a deterioration of a resolution may be prevented. Thus, display quality of the display apparatus 100 including the display panel 700 may be improved.

Figure 9:
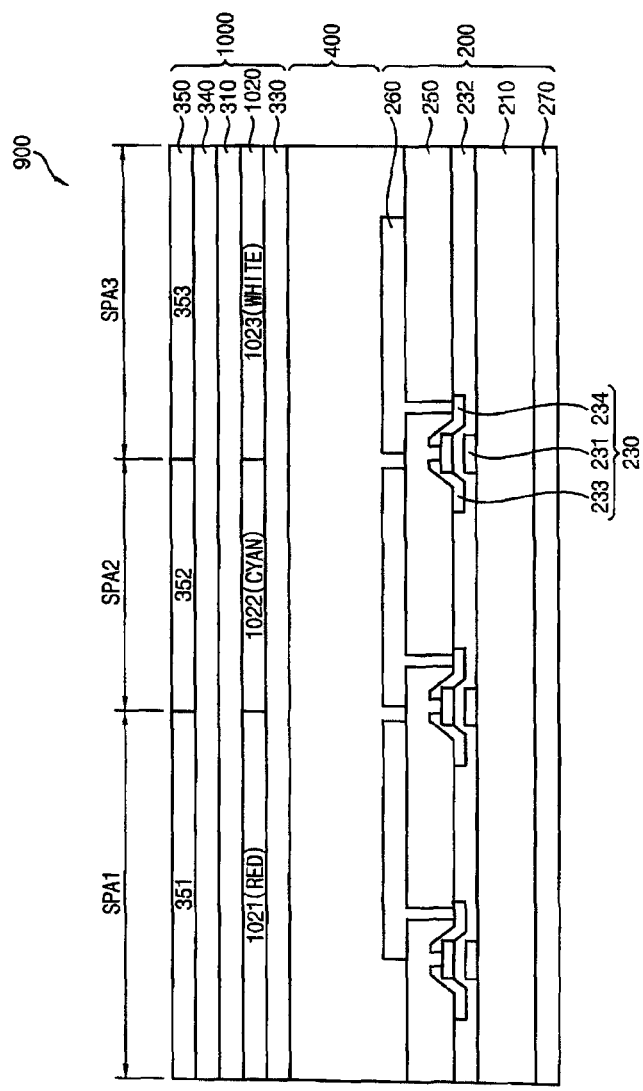
FIG. 9 is a cross-sectional view illustrating a display panel according to still another exemplary embodiment.

FIG. 9 is a cross-sectional view illustrating a display panel according to still another exemplary embodiment.

The display panel 900 according to the present exemplary embodiment may be in the display apparatus 100 according to the previous exemplary embodiment illustrated in FIG. 1. In addition, the display panel 900 according to the present exemplary embodiment is substantially the same as the display panel 110 according to the previous exemplary embodiment illustrated in FIG. 2 except for the second display substrate 300. Thus, the same reference numerals will be used to refer to same or like parts as those described in the previous example embodiment and any further repetitive explanation concerning the above elements will be omitted.

Referring to FIG. 9, the display panel 900 according to the present exemplary embodiment includes the first display substrate 200, a second display substrate 1000 and the liquid crystal layer 400.

The second display substrate 1000 includes the second base substrate 310 facing the first base substrate 210, a color filter layer 1020 formed on the front surface of the second base substrate 310, the common electrode 330 formed on the color filter layer 1020, and the retarder layer 350 formed on the rear surface of the second base substrate 310.

The color filter layer 1020 includes a first color filter 1021 formed in the first sub pixel area SPA1, a second color filter 1022 formed in the second sub pixel area SPA2, and a third color filter 1023 formed in the third sub pixel area SPA3. The first color filter 1021 and the second color filter 1022 include at least one of the magenta color filter, the cyan color filter and the yellow color filter, and the third color filter 1023 includes the white color filter. For example, the first color filter 1021 may be a red color filter, the second color filter 1022 may be the cyan color filter and the third color filter 1023 may be the white color filter.

FIGS. 10A to 10F are sequential diagrams illustrating a method of displaying the three-dimensional stereoscopic image using the display panel 900 of FIG. 9.

Figure 10A:
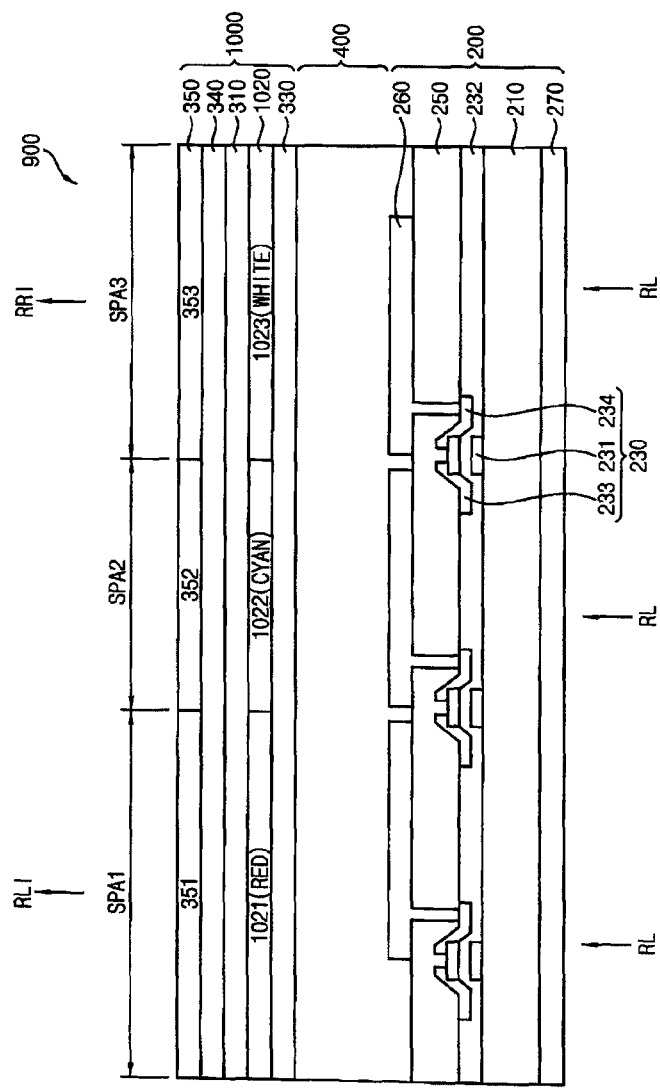
Figure 10B:
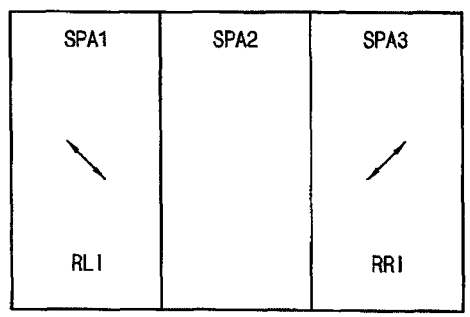

Referring to FIGS. 10A and 10B, the red light RL is provided to the display panel 900. Specifically, the light source part 160 outputs the red line RL to the display panel 900 during the first field period of the frame period. The red light RL transmits through the first color filter 1021 including the red color filter in the first sub pixel area SPA1 and is converted into the first polarized light by the first retarder portion 351. Thus, the red left-eye image RL1 is displayed in the first sub pixel area SPA1. In addition, the red light RL transmits through the third color filter 1023 including the white color filter and is converted into the second polarized light by the third retarder portion 353. Thus, the red right-eye image RR1 is displayed in the third sub pixel area SPA3.

Figure 10D:

Referring to FIGS. 10C and 10D, the green light GL is provided to the display panel 900. Specifically, the light source part 160 outputs the green light GL to the display panel 900 during the second field period next to the first field period of the frame period. The green light GL transmits through the second color filter 1022 including the cyan color filter in the second sub pixel area SPA2 and is converted into the first polarized light by the second retarder portion 352. Thus, the green left-eye image GL1 is displayed in the second sub pixel area SPA2. In addition, the green light GL transmits through the third color filter 1023 including the white color filter and is converted into the second polarized light by the third retarder portion 353. Thus, the green right-eye image GRI is displayed in the third sub pixel area SPA3.

Figure 10F:
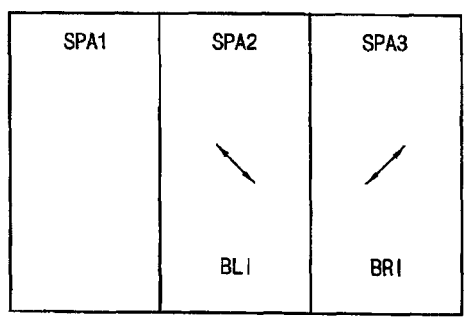

Referring to FIGS. 10E and 10F, the blue light BL is provided to the display panel 900. Specifically, the light source part 160 outputs the blue light BL to the display panel 900 during the third field period next to the second field period of the frame period. The blue light BL transmits through the second color filter 1022 including the cyan color filter in the second sub pixel area SPA2 and is converted into the first polarized light by the second retarder portion 352. Thus, the blue left-eye image BL1 is displayed in the second sub pixel area SPA2. In addition, the blue light BL transmits through the third color filter 1023 including the white color filter and is converted into the second polarized light by the third retarder portion 353. Thus, the blue right-eye image BR1 is displayed in the third sub pixel area SPA3. Thus, the three-dimensional stereoscopic image is displayed.

According to the present exemplary embodiment, the three-dimensional stereoscopic image is displayed during the first, second and third field periods in the field sequential color driving method, therefore a high speed driving is not required to the display apparatus 100 including the display panel 900. Thus, a driving speed of the display apparatus 100 may be decreased.

In addition, the left-eye image and the right-eye image respectively having the first polarization and the second polarization different from each other is displayed in the unit pixel UP including the first, second and third sub pixels SP1, SP2 and SP3, therefore a deterioration of a resolution may be prevented. Thus, display quality of the display apparatus 100 including the display panel 900 may be improved.

FIG. 11 is a cross-sectional view illustrating a display panel according to still another exemplary embodiment.

The display panel 1100 according to the present exemplary embodiment may be in the display apparatus 100 according to the previous exemplary embodiment illustrated in FIG. 1. In addition, the display panel 1100 according to the present exemplary embodiment is substantially the same as the display panel 110 according to the previous exemplary embodiment illustrated in FIG. 2 except for the second display substrate 300. Thus, the same reference numerals will be used to refer to same or like parts as those described in the previous example embodiment and any further repetitive explanation concerning the above elements will be omitted.

Referring to FIG. 11, the display panel 1100 according to the present exemplary embodiment includes the first display substrate 200, a second display substrate 1200 and the liquid crystal layer 400.

The second display substrate 1200 includes the second base substrate 310 facing the first base substrate 210, a color filter layer 1220 formed on the front surface of the second base substrate 310, the common electrode 330 formed on the color filter layer 1220, and the retarder layer 350 formed on the rear surface of the second base substrate 310.

The color filter layer 1220 includes a first color filter 1221 formed in the first sub pixel area SPA1, a second color filter 1222 formed in the second sub pixel area SPA2, and a third color filter 1223 formed in the third sub pixel area SPA3. The first color filter 1221 and the second color filter 1222 include at least one of the magenta color filter, the cyan color filter and the yellow color filter, and the third color filter 1223 includes the white color filter. For example, the first color filter 1221 may be the magenta color filter, the second color filter 1222 may be a green color filter and the third color filter 1223 may be the white color filter.

FIGS. 12A to 12F are sequential diagrams illustrating a method of displaying the three-dimensional stereoscopic image using the display panel 1100 of FIG. 11.

Figure 12B:

Referring to FIGS. 12A and 12B, the red light RL is provided to the display panel 1100. Specifically, the light source part 160 outputs the red line RL to the display panel 1100 during the first field period of the frame period. The red light RL transmits through the first color filter 1221 including the magenta color filter in the first sub pixel area SPA1 and is converted into the first polarized light by the first retarder portion 351. Thus, the red left-eye image RL1 is displayed in the first sub pixel area SPA1. In addition, the red light RL transmits through the third color filter 1223 including the white color filter and is converted into the second polarized light by the third retarder portion 353. Thus, the red right-eye image RR1 is displayed in the third sub pixel area SPA3.

Figure 12C:
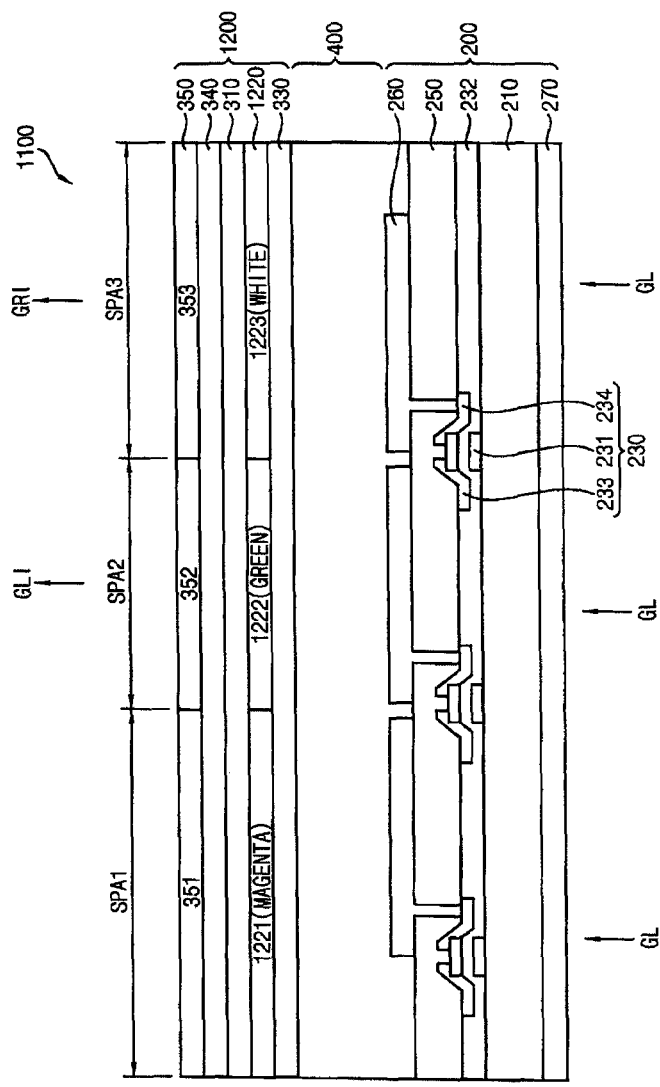
Figure 12D:
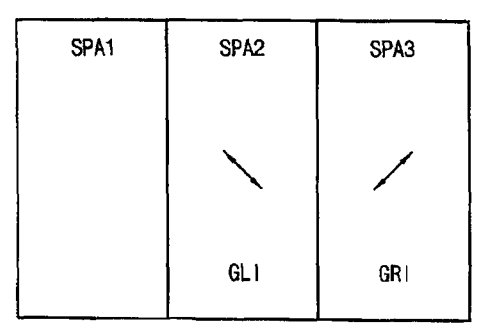

Referring to FIGS. 12C and 12D, the green light GL is provided to the display panel 1100. Specifically, the light source part 160 outputs the green light GL to the display panel 1100 during the second field period next to the first field period of the frame period. The green light GL transmits through the second color filter 1222 including the green color filter in the second sub pixel area SPA2 and is converted into the first polarized light by the second retarder portion 352. Thus, the green left-eye image GL1 is displayed in the second sub pixel area SPA2. In addition, the green light GL transmits through the third color filter 1223 including the white color filter and is converted into the second polarized light by the third retarder portion 353. Thus, the green right-eye image GRI is displayed in the third sub pixel area SPA3.

Figure 12E:
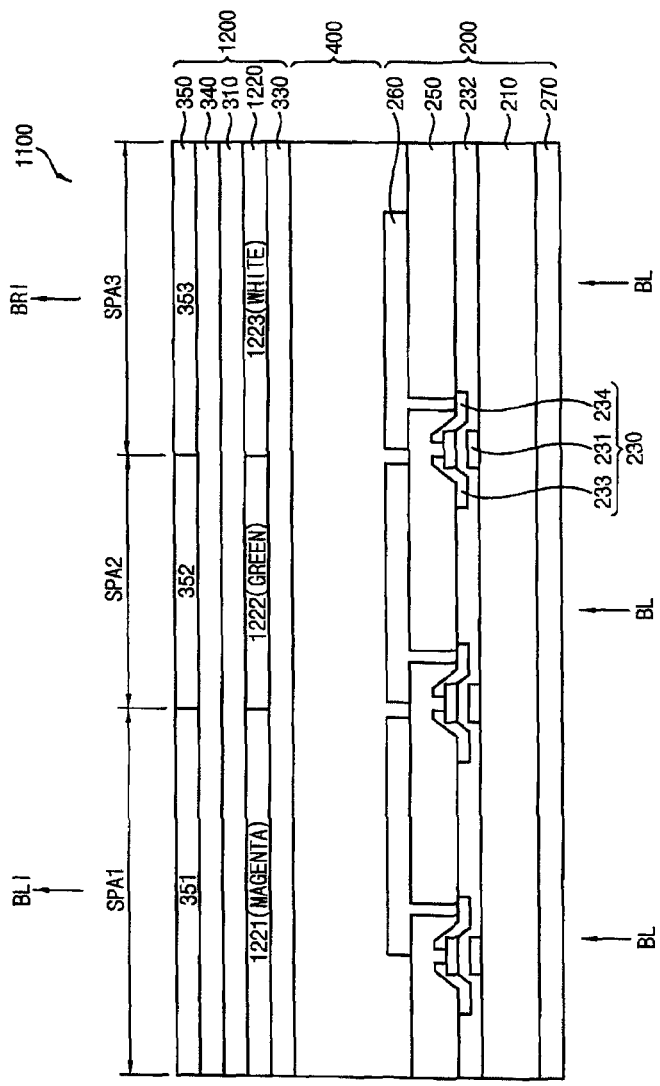
Figure 12F:
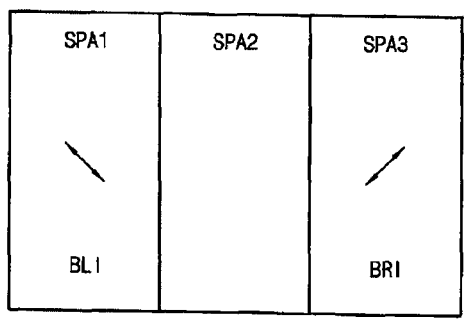

Referring to FIGS. 12E and 12F, the blue light BL is provided to the display panel 1100. Specifically, the light source part 160 outputs the blue light BL to the display panel 1100 during the third field period next to the second field period of the frame period. The blue light BL transmits through the first color filter 1221 including the magenta color filter in the first sub pixel area SPA1 and is converted into the first polarized light by the first retarder portion 351. Thus, the blue left-eye image BL1 is displayed in the first sub pixel area SPA1. In addition, the blue light BL transmits through the third color filter 1223 including the white color filter and is converted into the second polarized light by the third retarder portion 353. Thus, the blue right-eye image BR1 is displayed in the third sub pixel area SPA3. Thus, the three-dimensional stereoscopic image is displayed.

According to the present exemplary embodiment, the three-dimensional stereoscopic image is displayed during the first, second and third field periods in the field sequential color driving method, therefore a high speed driving is not required to the display apparatus 100 including the display panel 1100. Thus, a driving speed of the display apparatus 100 may be decreased.

In addition, the left-eye image and the right-eye image respectively having the first polarization and the second polarization different from each other is displayed in the unit pixel UP including the first, second and third sub pixels SP1, SP2 and SP3, therefore a deterioration of a resolution may be prevented. Thus, display quality of the display apparatus 100 including the display panel 1100 may be improved.

Figure 13:
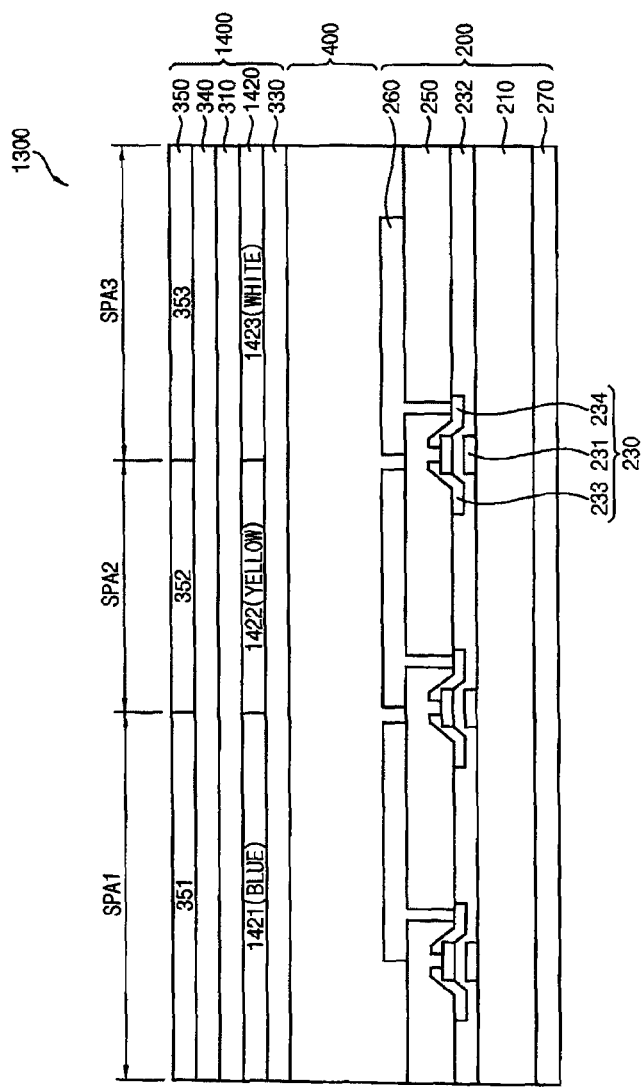
FIG. 13 is a cross-sectional view illustrating a display panel according to still another exemplary embodiment.

FIG. 13 is a cross-sectional view illustrating a display panel according to still another exemplary embodiment.

The display panel 1300 according to the present exemplary embodiment may be in the display apparatus 100 according to the previous exemplary embodiment illustrated in FIG. 1. In addition, the display panel 1300 according to the present exemplary embodiment is substantially the same as the display panel 110 according to the previous exemplary embodiment illustrated in FIG. 2 except for the second display substrate 300. Thus, the same reference numerals will be used to refer to same or like parts as those described in the previous example embodiment and any further repetitive explanation concerning the above elements will be omitted.

Referring to FIG. 13, the display panel 1300 according to the present exemplary embodiment includes the first display substrate 200, a second display substrate 1400 and the liquid crystal layer 400.

The second display substrate 1400 includes the second base substrate 310 facing the first base substrate 210, a color filter layer 1420 formed on the front surface of the second base substrate 310, the common electrode 330 formed on the color filter layer 1220, and the retarder layer 350 formed on the rear surface of the second base substrate 310.

The color filter layer 1420 includes a first color filter 1421 formed in the first sub pixel area SPA1, a second color filter 1422 formed in the second sub pixel area SPA2, and a third color filter 1423 formed in the third sub pixel area SPA3. The first color filter 1421 and the second color filter 1422 include at least one of the magenta color filter, the cyan color filter and the yellow color filter, and the third color filter 1423 includes the white color filter. For example, the first color filter 1421 may be a blue color filter, the second color filter 1422 may be the yellow color filter and the third color filter 1423 may be the white color filter.

FIGS. 14A to 14F are sequential diagrams illustrating a method of displaying the three-dimensional stereoscopic image using the display panel 1300 of FIG. 13.

Figure 14A:
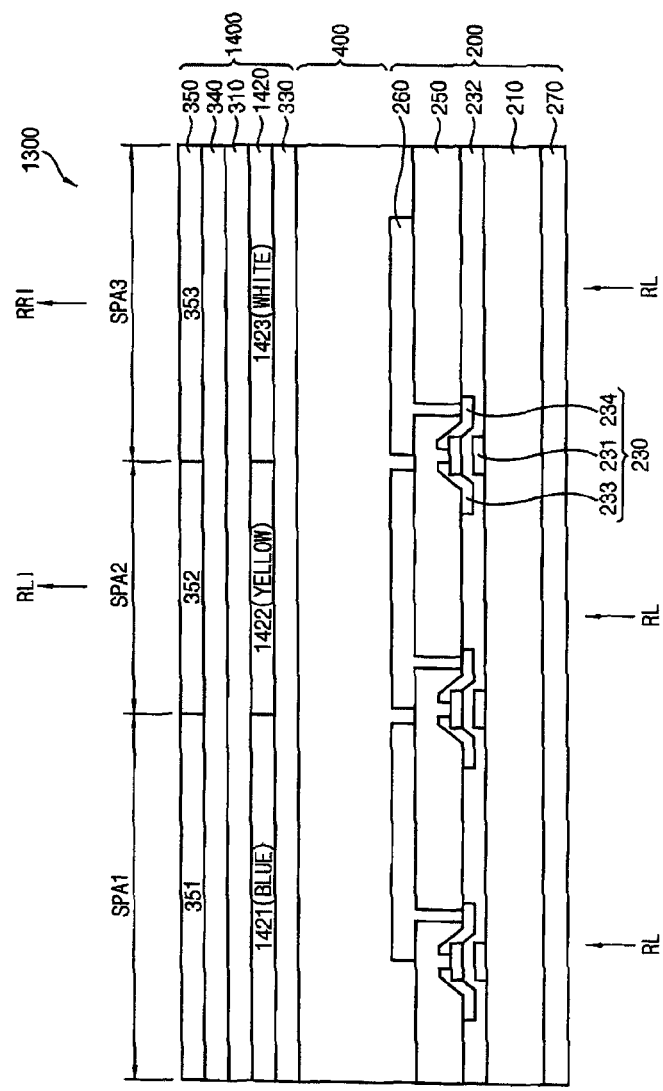
Figure 14B:
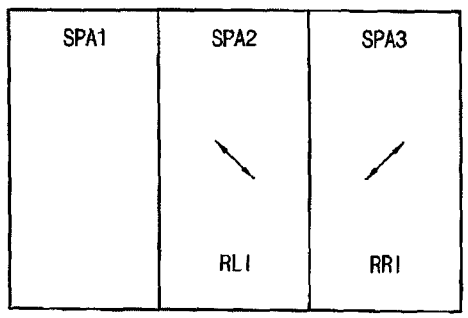

Referring to FIGS. 14A and 14B, the red light RL is provided to the display panel 1300. Specifically, the light source part 160 outputs the red line RL to the display panel 1300 during the first field period of the frame period. The red light RL transmits through the second color filter 1422 including the yellow color filter in the second sub pixel area SPA2 and is converted into the first polarized light by the second retarder portion 352. Thus, the red left-eye image RL1 is displayed in the second sub pixel area SPA2. In addition, the red light RL transmits through the third color filter 1423 including the white color filter and is converted into the second polarized light by the third retarder portion 353. Thus, the red right-eye image RR1 is displayed in the third sub pixel area SPA3.

Figure 14D:
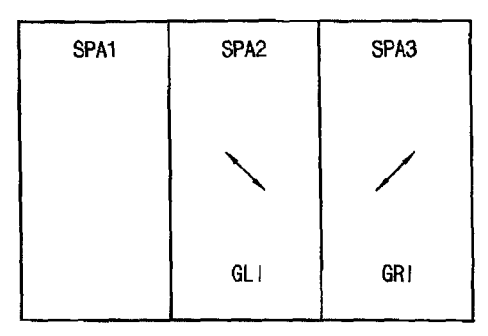

Referring to FIGS. 14C and 14D, the green light GL is provided to the display panel 1300. Specifically, the light source part 160 outputs the green light GL to the display panel 1300 during the second field period next to the first field period of the frame period. The green light GL transmits through the second color filter 1422 including the yellow color filter in the second sub pixel area SPA2 and is converted into the first polarized light by the second retarder portion 352. Thus, the green left-eye image GL1 is displayed in the second sub pixel area SPA2. In addition, the green light GL transmits through the third color filter 1423 including the white color filter and is converted into the second polarized light by the third retarder portion 353. Thus, the green right-eye image GRI is displayed in the third sub pixel area SPA3.

Figure 14E:
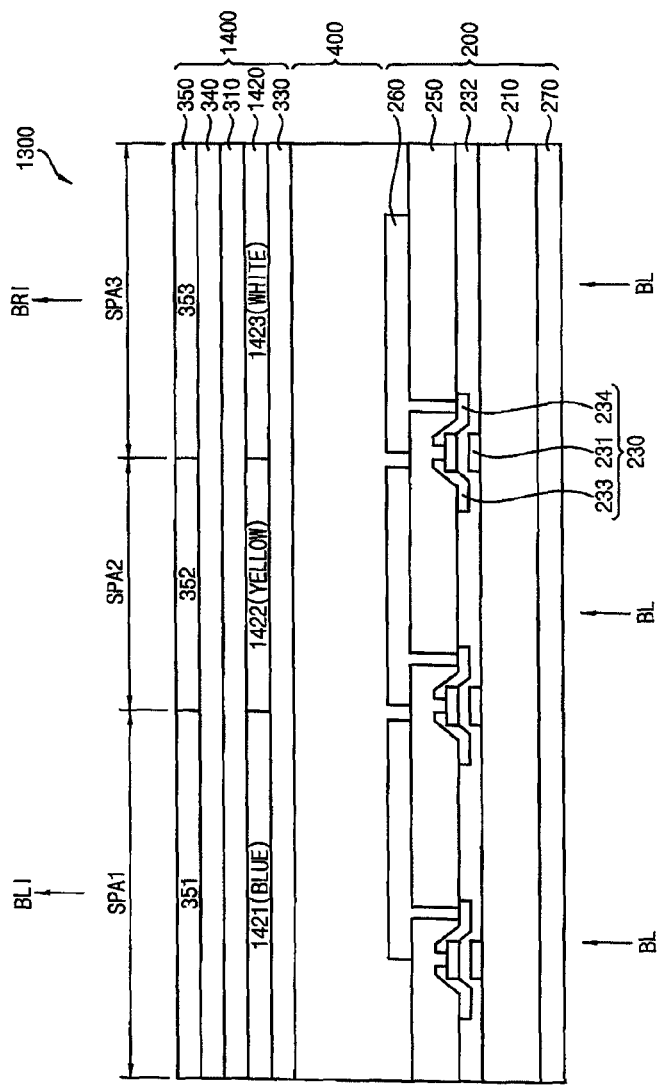
Figure 14F:
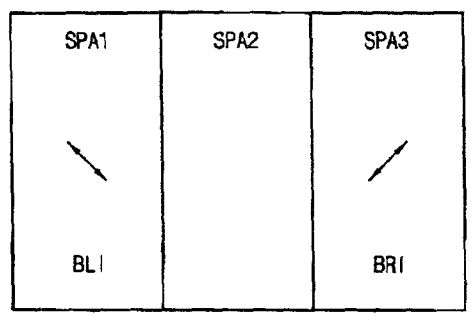

Referring to FIGS. 14E and 14F, the blue light BL is provided to the display panel 1300. Specifically, the light source part 160 outputs the blue light BL to the display panel 1300 during the third field period next to the second field period of the frame period. The blue light BL transmits through the first color filter 1421 including the blue color filter in the first sub pixel area SPA1 and is converted into the first polarized light by the first retarder portion 351. Thus, the blue left-eye image BL1 is displayed in the first sub pixel area SPA1. In addition, the blue light BL transmits through the third color filter 1423 including the white color filter and is converted into the second polarized light by the third retarder portion 353. Thus, the blue right-eye image BR1 is displayed in the third sub pixel area SPA3. Thus, the three-dimensional stereoscopic image is displayed.

According to the present exemplary embodiment, the three-dimensional stereoscopic image is displayed during the first, second and third field periods in the field sequential color driving method, therefore a high speed driving is not required to the display apparatus 100 including the display panel 1300. Thus, a driving speed of the display apparatus 100 may be decreased.

In addition, the left-eye image and the right-eye image respectively having the first polarization and the second polarization different from each other is displayed in the unit pixel UP including the first, second and third sub pixels SP1, SP2 and SP3, therefore a deterioration of a resolution may be prevented. Thus, display quality of the display apparatus 100 including the display panel 1300 may be improved.

According to the display substrate, the display panel and the display apparatus having the display substrate, a three-dimensional stereoscopic image is displayed during first, second and third field periods in a field sequential color driving method, therefore a high speed driving is not required to a display apparatus. Thus, a driving speed of the display apparatus displaying the three-dimensional stereoscopic image may be decreased.

In addition, a left-eye image and a right-eye image respectively having a first polarization and a second polarization different from each other is displayed in a unit pixel including first, second and third sub pixels, therefore a deterioration of a resolution may be prevented. Thus, display quality of the display apparatus displaying the three-dimensional stereoscopic image may be improved.

The foregoing is illustrative of the inventive concept and is not to be construed as limiting thereof. Although a few exemplary embodiments have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A display substrate comprising:
    a base substrate including a first sub pixel area, a second sub pixel area and a third sub pixel area;
    a color filter layer disposed on a front surface of the base substrate and including at least one of a magenta color filter, a cyan color filter and a yellow color filter in the first sub pixel area and the second sub pixel area and a white color filter in the third sub pixel area; and
    a retarder layer disposed on a rear surface of the base substrate opposite to the front surface of the base substrate, the retarder layer configured to polarize light in the first sub pixel area and the second sub pixel area to form a first polarized light, the retarder layer further configured to polarize the light in the third sub pixel area to form a second polarized light, the second polarized light being different from the first polarized light,
    wherein the first sub pixel area and the second sub pixel area are configured to display a left-eye image or a right-eye image, and the third sub pixel area is configured to display the right-eye image or the left-eye image differently from the first sub pixel area and the second sub pixel area.

2. The display substrate of claim 1, wherein the color filter layer includes a first color filter including the magenta color filter in the first sub pixel area, a second color filter including the cyan color filter in the second sub pixel area, and a third color filter including the white color filter in the third sub pixel area.

3. The display substrate of claim 1, wherein the color filter layer includes a first color filter including the cyan color filter in the first sub pixel area, a second color filter including the yellow color filter in the second sub pixel area, and a third color filter including the white color filter in the third sub pixel area.

4. The display substrate of claim 1, wherein the color filter layer includes a first color filter including the magenta color filter in the first sub pixel area, a second color filter including the yellow color filter in the second sub pixel area, and a third color filter including the white color filter in the third sub pixel area.

5. The display substrate of claim 1, wherein the color filter layer includes a first color filter including a red color filter in the first sub pixel area, a second color filter including the cyan color filter in the second sub pixel area, and a third color filter including the white color filter in the third sub pixel area.

6. The display substrate of claim 1, wherein the color filter layer includes a first color filter including the magenta color filter in the first sub pixel area, a second color filter including a green color filter in the second sub pixel area, and a third color filter including the white color filter in the third sub pixel area.

7. The display substrate of claim 1, wherein the color filter layer includes a first color filter including a blue color filter in the first sub pixel area, a second color filter including the yellow color filter in the second sub pixel area, and a third color filter including the white color filter in the third sub pixel area.

8. A display panel comprising:
    a first display substrate comprising:
        a first base substrate including a first sub pixel area, a second sub pixel area and a third sub pixel area;
        a gate line and a data line formed on the first base substrate;
        a thin film transistor electrically connected to the gate line and the data line; and
        a pixel electrode electrically connected to a drain electrode of the thin film transistor; and
    a second display substrate comprising:
        a second base substrate facing the first base substrate;
        a color filter layer disposed on a front surface of the second base substrate and including at least one of a magenta color filter, a cyan color filter and a yellow color filter in the first sub pixel area and the second sub pixel area and a white color filter in the third sub pixel area;
        a common electrode disposed on the color filter layer; and
        a retarder layer disposed on a rear surface of the second base substrate opposite to the front surface of the second base substrate, the retarder layer configured to polarize light in the first sub pixel area and the second sub pixel area to form a first polarized light, the retarder layer further configured to polarize the light in the third sub pixel area to form a second polarized light, the second polarized light being different from the first polarized light,
    wherein the first sub pixel area and the second sub pixel area are configured to display a left-eye image or a right-eye image, and the third sub pixel area is configured to display the right-eye image or the left-eye image differently from the first sub pixel area and the second sub pixel area.

9. A display apparatus comprising:
    a display panel comprising:
    a first display substrate comprising:
        a first base substrate including a first sub pixel area, a second sub pixel area and a third sub pixel area;
        a gate line and a data line formed on the first base substrate;
        a thin film transistor electrically connected to the gate line and the data line; and a pixel electrode electrically connected to a drain electrode of the thin film transistor; and a second display substrate comprising:
  a second base substrate facing the first base substrate;
  a color filter layer disposed on a front surface of the second base substrate and including at least one of a magenta color filter, a cyan color filter and a yellow color filter in the first sub pixel area and the second sub pixel area and a white color filter in the third sub pixel area;
  a common electrode disposed on the color filter layer; and
  a retarder layer disposed on a rear surface of the second base substrate opposite to the front surface of the second base substrate, the retarder layer configured to polarize light in the first sub pixel area and the second sub pixel area to form a first polarized light, the retarder layer further configured to polarize the light in the third sub pixel area to form a second polarized light, the second polarized light being different from the first polarized light;

a gate driving part configured to output a gate signal to the gate line;

a data driving part configured to output a data signal to the data line; and a light source part configured to provide the light to the display panel, wherein the first sub pixel area and the second sub pixel area are configured to display a left-eye image or a right-eye image, and the third sub pixel area is configured to display the right-eye image or the left-eye image differently from the first sub pixel area and the second sub pixel area.

10. The display apparatus of claim 9, wherein the light source part is configured to provide a red light to the display panel in a first field, a green light to the display panel in a second field next to the first field, and a blue light to the display panel in a third field next to the second field.

11. The display apparatus of claim 9, wherein the light source part is configured to provide a yellow light to the display panel in a first field, and a blue light to the display panel in a second field next to the first field.

12. The display apparatus of claim 9, wherein the color filter layer includes a first color filter including the magenta color filter in the first sub pixel area, a second color filter including the cyan color filter in the second sub pixel area, and a third color filter including the white color filter in the third sub pixel area.

13. The display apparatus of claim 9, wherein the color filter layer includes a first color filter including the cyan color filter in the first sub pixel area, a second color filter including the yellow color filter in the second sub pixel area, and a third color filter including the white color filter in the third sub pixel area.

14. The display apparatus of claim 9, wherein the color filter layer includes a first color filter including the magenta color filter in the first sub pixel area, a second color filter including the yellow color filter in the second sub pixel area, and a third color filter including the white color filter in the third sub pixel area.

15. The display apparatus of claim 9, wherein the color filter layer includes a first color filter including a red color filter in the first sub pixel area, a second color filter including the cyan color filter in the second sub pixel area, and a third color filter including the white color filter in the third sub pixel area.

16. The display apparatus of claim 9, wherein the color filter layer includes a first color filter including the magenta color filter in the first sub pixel area, a second color filter including a green color filter in the second sub pixel area, and a third color filter including the white color filter in the third sub pixel area.

17. The display apparatus of claim 9, wherein the color filter layer includes a first color filter including a blue color filter in the first sub pixel area, a second color filter including the yellow color filter in the second sub pixel area, and a third color filter including the white color filter in the third sub pixel area.

* * * * *